(12) United States Patent
Kamiya et al.

(10) Patent No.: US 11,042,658 B2
(45) Date of Patent: *Jun. 22, 2021

(54) DOCUMENT MANAGEMENT SYSTEM AND PROCESSING APPARATUS

(71) Applicant: FUJIFILM BUSINESS INNOVATION CORP., Tokyo (JP)

(72) Inventors: Shigeki Kamiya, Tokyo (JP); Tetsuo Iyoda, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 378 days.

This patent is subject to a terminal disclaimer.

(21) Appl. No.: 15/689,288

(22) Filed: Oct. 4, 2017

(65) Prior Publication Data

US 2018/0268155 A1 Sep. 20, 2018

(30) Foreign Application Priority Data

Mar. 17, 2017 (JP) .............................. JP2017-052850

(51) Int. Cl.
*G06F 21/62* (2013.01)
*G06F 21/60* (2013.01)
(Continued)

(52) U.S. Cl.
CPC ........ *G06F 21/6209* (2013.01); *G06F 21/335* (2013.01); *G06F 21/41* (2013.01);
(Continued)

(58) Field of Classification Search
None
See application file for complete search history.

(56) References Cited

U.S. PATENT DOCUMENTS 5,509,074 A    4/1996   Choudhury et al.
9,682,590 B1 *   6/2017   Ramarao ................ B42D 15/00
(Continued)

FOREIGN PATENT DOCUMENTS

EP    2 400 417 A2    12/2011
EP    2 797 254 A1    10/2014
(Continued)

OTHER PUBLICATIONS

Sep. 1, 2018 Office Action issued in Australian Patent Application No. 2017232228.

(Continued)

*Primary Examiner* — Fatoumata Traore
(74) *Attorney, Agent, or Firm* — Oliff PLC

(57) ABSTRACT

A document management system includes a management apparatus and plural processing apparatuses. Each of the plural processing apparatuses includes an acquisition unit and a transmitter. The acquisition unit acquires a document and information on a destination to which the document is transmitted. The transmitter transmits metadata of the document to the management apparatus and transmits a protected document generated from the document to the destination. The metadata includes the information on the destination. The management apparatus includes a memory and a response unit. The memory stores metadata of documents received from the plural processing apparatuses. The response unit responds to a request for metadata corresponding to a document by returning metadata of the document which is stored in the memory.

12 Claims, 18 Drawing Sheets

(51) Int. Cl.
   *H04L 9/32* (2006.01)
   *H04L 9/08* (2006.01)
   *G06F 21/33* (2013.01)
   *G06F 21/41* (2013.01)

(52) U.S. Cl.
   CPC .......... *G06F 21/608* (2013.01); *H04L 9/0825* (2013.01); *H04L 9/3247* (2013.01); *H04L 9/3297* (2013.01); *G06F 2211/007* (2013.01)

(56) References Cited

U.S. PATENT DOCUMENTS

| | | | |
|---|---|---|---|
| 2006/0093150 | A1 | 5/2006 | Reddy et al. |
| 2007/0156670 | A1* | 7/2007 | Lim .................... G06F 21/6218 |
| 2008/0126543 | A1* | 5/2008 | Hamada ................. G06F 16/41 709/225 |
| 2010/0235649 | A1* | 9/2010 | Jeffries ............... G06F 21/6209 713/189 |
| 2010/0257351 | A1 | 10/2010 | O'Connor et al. |
| 2011/0131175 | A1* | 6/2011 | Kawai ................. G06F 21/6272 707/608 |
| 2012/0219269 | A1* | 8/2012 | Koreeda ................ H04N 5/913 386/259 |
| 2013/0346522 | A1 | 12/2013 | Lennstrom et al. |
| 2014/0281514 | A1 | 9/2014 | Erofeev et al. |
| 2015/0186657 | A1* | 7/2015 | Nakhjiri .................. H04L 63/06 713/155 |
| 2015/0281152 | A1 | 10/2015 | Dijoux et al. |
| 2017/0070638 | A1* | 3/2017 | Min ..................... G06F 21/608 |

FOREIGN PATENT DOCUMENTS

| | | |
|---|---|---|
| JP | S63-240677 | 10/1988 |
| JP | H07-239828 A | 9/1995 |
| JP | H09-223130 A | 8/1997 |
| JP | 2002-117044 A | 4/2002 |
| JP | 2003-177991 A | 6/2003 |
| JP | 2005-501322 A | 1/2005 |
| JP | 2006-260521 A | 9/2006 |
| JP | 2007-193477 A | 8/2007 |
| JP | 2007-243812 A | 9/2007 |
| JP | 2008-134966 A | 6/2008 |
| JP | 2010-206540 A | 9/2010 |
| JP | 2011-082952 A | 4/2011 |
| JP | 2013-026870 A | 2/2013 |
| JP | 2016-212293 A | 12/2016 |
| JP | 2017-017559 A | 1/2017 |

OTHER PUBLICATIONS

May 7, 2019 Office Action issued in Japanese Patent Application No. 2017-052850.
Mar. 28, 2019 Examination Report issued in Australian Patent Application No. 2017232228.
Jun. 23, 2020 Office Action issued in Japanese Patent Application No. 2019-123548.
Jul. 24, 2020 Examination Report issued in Australian Patent Application No. 2019222893.
Jun. 9, 2020 Office Action issued in Japanese Patent Application No. 2019-121128.
Nov. 17, 2020 Office Action issued in Japanese Patent Application No. 2019-123548.

* cited by examiner

FIG. 9 eDoc DISTRIBUTION — 400

DESTINATION USER
- User0001 — 402
  - User0001
  - User0003
- ADD
- DELETE
— 404

DESTINATION TERMINAL
- Viewer001 — 406
  - Viewer001
  - Viewer004
- ADD
- DELETE
— 408

ACCESS PRIVILEGE — 410
- ☐ VIEW   ☐ MODIFY
- ☐ PRINT  ☐ COPY

OFFLINE EXPIRATION PERIOD
- 30 MINUTES — 412

OPTION SETTING — 414    OK    CANCEL

DOCUMENT MANAGEMENT SYSTEM AND PROCESSING APPARATUS

CROSS-REFERENCE TO RELATED APPLICATIONS

This application is based on and claims priority under 35 USC 119 from Japanese Patent Application No. 2017-052850 filed Mar. 17, 2017.

BACKGROUND

(i) Technical Field

The present invention relates to a document management system and a processing apparatus.

(ii) Related Art

In a system for providing documents to users, a device that registers an intended document in the system generates metadata indicating attribute information on the document, holds the generated metadata in association with the document, and provides or manages the document by using the metadata.

SUMMARY

According to an aspect of the invention, there is provided a document management system including a management apparatus and plural processing apparatuses. Each of the plural processing apparatuses includes an acquisition unit and a transmitter. The acquisition unit acquires a document and information on a destination to which the document is transmitted. The transmitter transmits metadata of the document to the management apparatus and transmits a protected document generated from the document to the destination. The metadata includes the information on the destination. The management apparatus includes a memory and a response unit. The memory stores metadata of documents received from the plural processing apparatuses. The response unit responds to a request for metadata corresponding to a document by returning metadata of the document which is stored in the memory.

BRIEF DESCRIPTION OF THE DRAWINGS

An exemplary embodiment of the present invention will be described in detail based on the following figures, wherein:

FIG. 9 illustrates an example input screen for entering attribute data;

DETAILED DESCRIPTION

Figure 1:
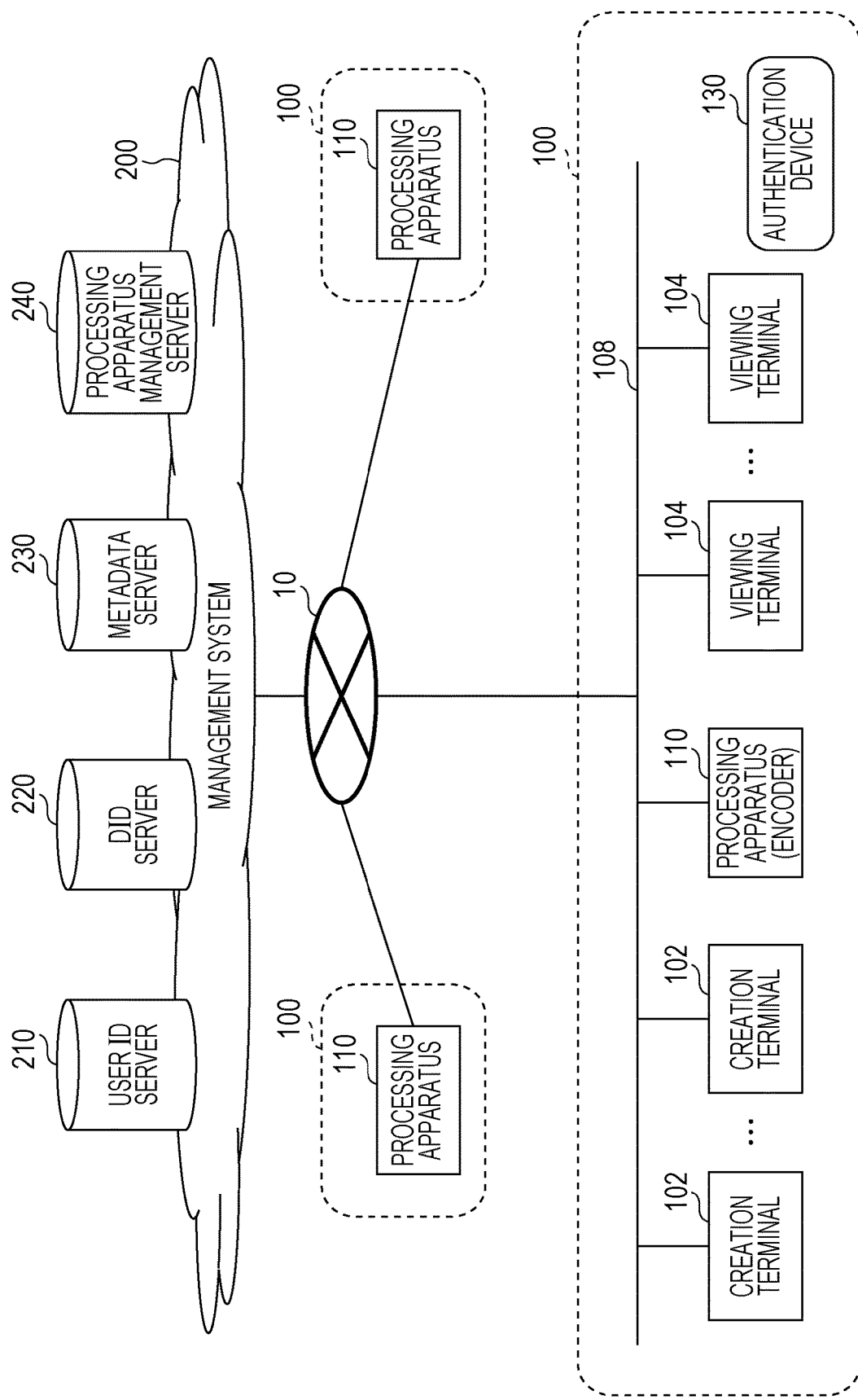
FIG. 1 illustrates an example configuration of a document management system.

FIG. 1 illustrates a schematic configuration of a document management system according to an exemplary embodiment.

Paper documents are easily copied by persons who have the documents and copies of the documents are passed to others. Persons who obtain the copies are able to read the documents. In this way, paper documents carry a high risk of leakage of information.

A document management system according to this exemplary embodiment is used to provide an environment that enables secure use of electronic documents to reduce the risk of leaking information from the documents. The term "document", as used herein, refers to content data distributed as a unit (for example, a file), and the content data is not limited to any particular type. The concept of the document includes, for example, but is not limited to, text data, document data created using word processor software, spreadsheet data created using spreadsheet software, computer aided design (CAD) data, image data, video data, audio data, multimedia data, page data displayed on a web browser, and any other data created, edited, and viewed on personal computers (PCs) and then printed.

The document management system includes multiple local systems 100 and a management system 200 that manages the local systems 100 (in particular, manages processing systems described below). The management system 200 is capable of individually communicating with the local systems 100 via a wide area network 10 such as the Internet.

Each of the local systems 100 includes one or more creation terminals 102, one or more viewing terminals 104, and a processing apparatus 110, which are connected to a local network 108. The local network 108 is a private network (for example, a local area network (LAN)) set up in an organization such as an enterprise and is protected from the wide area network 10 by a firewall or the like. Fundamentally, each local system 100 includes a single processing apparatus 110. When a private network in an organization is a large-scale network, individual network segments constituting the private network may each serve as one of the local systems 100, and each of the local systems 100 may be provided with a single processing apparatus 110. For example, a network segment within a room for each department of a certain company is one of the local systems 100 of the department, and a single processing apparatus 110 is placed in the segment. In the illustrated example, the local systems 100 are configured for respective companies or for respective departments of each company, and processing apparatuses 110, each of which is included as a core of one of the local systems 100, are managed by the management system 200, which serves as a central management system.

The creation terminal 102 is a terminal used to create a document. Examples of the creation terminal 102 include a desktop or notebook personal computer, a workstation, a tablet terminal, a smartphone, a multifunction device, a scanner, a facsimile device, and a digital camera. The creation terminal 102 has installed therein an application for creating or editing a document or performing any other operation on a document. The creation terminal 102 further has installed therein software for requesting the document management system to distribute a created document. The software may be implemented as, for example, a device driver for exchanging information with the processing apparatus 110, described below, or may be implemented as a web application.

The processing apparatus 110 executes a protection process for converting a document created by the creation terminal 102 into a protected document (hereinafter also referred to as an "eDoc file"). The protected document is used in a secure environment provided by the document management system according to this exemplary embodiment. The protection process may be a process for encoding an original document into eDoc format, and in this sense the processing apparatus 110 is an encoder. In the protection process, for example, a document is converted into data in a dedicated format designed for the system according to this exemplary embodiment, and is encrypted in form that can be decrypted by only users designated as destinations of the document. Either of the format conversion and encryption may be performed first.

The processing apparatus 110 also creates metadata of the protected document and registers the created metadata in a higher-level system, namely, the management system 200. The metadata includes, for example, the bibliography of the protected document, information on destinations, and information on keys used by each destination to decrypt the protected document. The metadata includes multiple items, and, in accordance with a function provided through the corresponding service, the associated device or user assigns, edits, and updates data.

By way of example, some of the items are specified by a user who has instructed the document management system to register the document, and other items are created by the processing apparatus 110. Alternatively, the management system 200 or the viewing terminal 104 may set the values of some items in the metadata. The processing apparatus 110 transmits the generated protected document (eDoc file) to the viewing terminal 104 at the destination specified by the user.

The protected document, or eDoc file, is obtained by converting the original document into the dedicated format and encrypting the resulting data, and is also referred to as the eDoc body. In order to make the eDoc file viewable, the corresponding metadata is necessary. The eDoc file and the metadata are combined to form a viewable, complete protected document. A combination of an eDoc file and corresponding metadata is hereinafter referred to as an "eDoc".

The processing apparatus 110 may have the wireless LAN access point function. In this case, the viewing terminal 104 is capable of communicating with the processing apparatus 110 via wireless LAN.

The viewing terminal 104 is a terminal used to view the protected document (eDoc file). The term "view", as used herein, refers to the use of the protected document in a way corresponding to information content indicated by the document. For example, when the protected document has word processor data or a document such as drawings as information content, the term "view" is used to indicate that a user reads or browses the document displayed on the viewing terminal 104. When the information content indicated by the protected document is audio, the term "view" is used to indicate that a user listens to audio reproduced by the viewing terminal 104. The viewing terminal 104 is implemented by installing a viewer application for viewing the protected document into a general-purpose computer such as a desktop or notebook personal computer, a workstation, a tablet terminal, or a smartphone. Alternatively, a terminal for viewing purposes only, such as an electronic book reading terminal, may be provided with a function equivalent to that of the viewer application to form the viewing terminal 104. The viewer application has a function of decrypting an encrypted protected document by using information of metadata or a function of decoding data indicated by a dedicated format of a protected document into readable data. Note that a computer which does not include the viewer application supported by the document management system according to this exemplary embodiment is not able to decode data in the dedicated format into readable data.

The viewing terminal 104 may have a function of decrypting and decoding a protected document and displaying the resulting document, and a function of accepting modification (editing) of the displayed document from the user. The modified document has different content from the original protected document. The viewing terminal 104 may be able to send the edited document to the processing apparatus 110 and register the document in the document management system (i.e., encode the document into a protected document). Accordingly, a single terminal may have the functions of both the creation terminal 102 and the viewing terminal 104. An eDoc includes a privilege granted to a viewer (access privilege information in the metadata described below), and the privilege may include, for example, the writing restriction to the eDoc and the restriction of redistribution destinations. In the case of an eDoc including access privilege information that specifies such restrictions, the viewing terminal 104 accepts the modification (editing) operation from the viewer only within the range of the writing restriction, and also accepts the designation of destinations of redistribution of a new modified eDoc only within the range of the restriction of redistribution destinations.

In this exemplary embodiment, a tool for authenticating a user who uses the document management system according to this exemplary embodiment is implemented as an authentication device 130 carried by the user, by way of example. Like an integrated circuit (IC) card, the authentication device 130 is a device having identification information specific to the user who carries the authentication device 130 and configured to execute data processing for user authentication in response to a request from an external device. The authentication device 130 may be a mobile terminal such as a smartphone having functions equivalent to those of such an IC card used for personal authentication. The viewing terminal 104 or the creation terminal 102 has a function of communicating with the authentication device 130 by using a wireless communication protocol such as Near Field Communication (NFC). The viewing terminal 104 or the creation terminal 102 exchanges information for user authentication with the authentication device 130 in accordance with a predetermined protocol and authenticates the user who carries the authentication device 130. Alternatively, a server in the document management system according to this exemplary embodiment, such as the processing apparatus 110 or the management system 200, may perform actual user authentication, and the viewing terminal 104 or the creation terminal 102 may act as an intermediate device between the server and the authentication device 130 to transfer data therebetween. The viewing terminal 104 or the creation terminal 102 may have the function of the authentication device 130.

The management system 200 manages the processing apparatuses 110 in the respective local systems 100. The management system 200 further manages metadata of protected documents generated by the processing apparatuses 110 and provides the metadata to the viewing terminals 104 in response to requests. The management system 200 is constituted by a single computer or multiple computers capable of communicating with one another, and has the functions of a user ID server 210, a DID server 220, a metadata server 230, and a processing apparatus management server 240.

The user ID server 210 is a server that manages information on each user who uses the document management system. There are two classes of users who use the document management system. One class is contractor who has entered into a contract with the operator of the document management system to use the document management system, and the other class is general user who actually uses the system under the contract to register or view a document. For example, the following case may be typical. The processing apparatus 110 is located on the local network 108 within a company that is a contractor, and employees of the company who are general users use the document management system via the processing apparatus 110. The user ID server 210 holds and manages information regarding the contractor and information regarding the general users.

The DID server 220 manages a document ID (DID) that is identification information (ID) of a protected document. A protected document is actually assigned a DID by the processing apparatus 110 that has created the protected document. The DID server 220 assigns the privilege to issue DIDs (hereinafter referred to as "DID issuance privilege" or "issuance privilege") and the issuance quota (the number of issuable DIDs) to the processing apparatus 110, and receives and records a report of DIDs actually issued by the processing apparatus 110 within the issuance privilege and the issuance quota. Thus, the DID server 220 may prevent or reduce the occurrence of unauthorized DIDs and may sense a document having an unauthorized DID.

The metadata server 230 holds and manages metadata of protected documents (eDoc files) generated by the processing apparatuses 110. Upon receipt of a request for metadata of a protected document from a user via the viewing terminal 104, the metadata server 230 provides the metadata to the viewing terminal 104 if the user is an authorized person. A user (viewer) who requests metadata is identified as an "authorized person" for the metadata server 230 when the combination of the user and the viewing terminal 104 used by the user to send the request matches a combination of a destination user and a destination viewing terminal 104 that is specified in destination information (described in detail below) in the metadata held by the metadata server 230 in association with the DID of the eDoc file (the DID is included in the request).

The processing apparatus management server 240 is a server that manages the status (state) of each processing apparatus 110.

Figure 2:
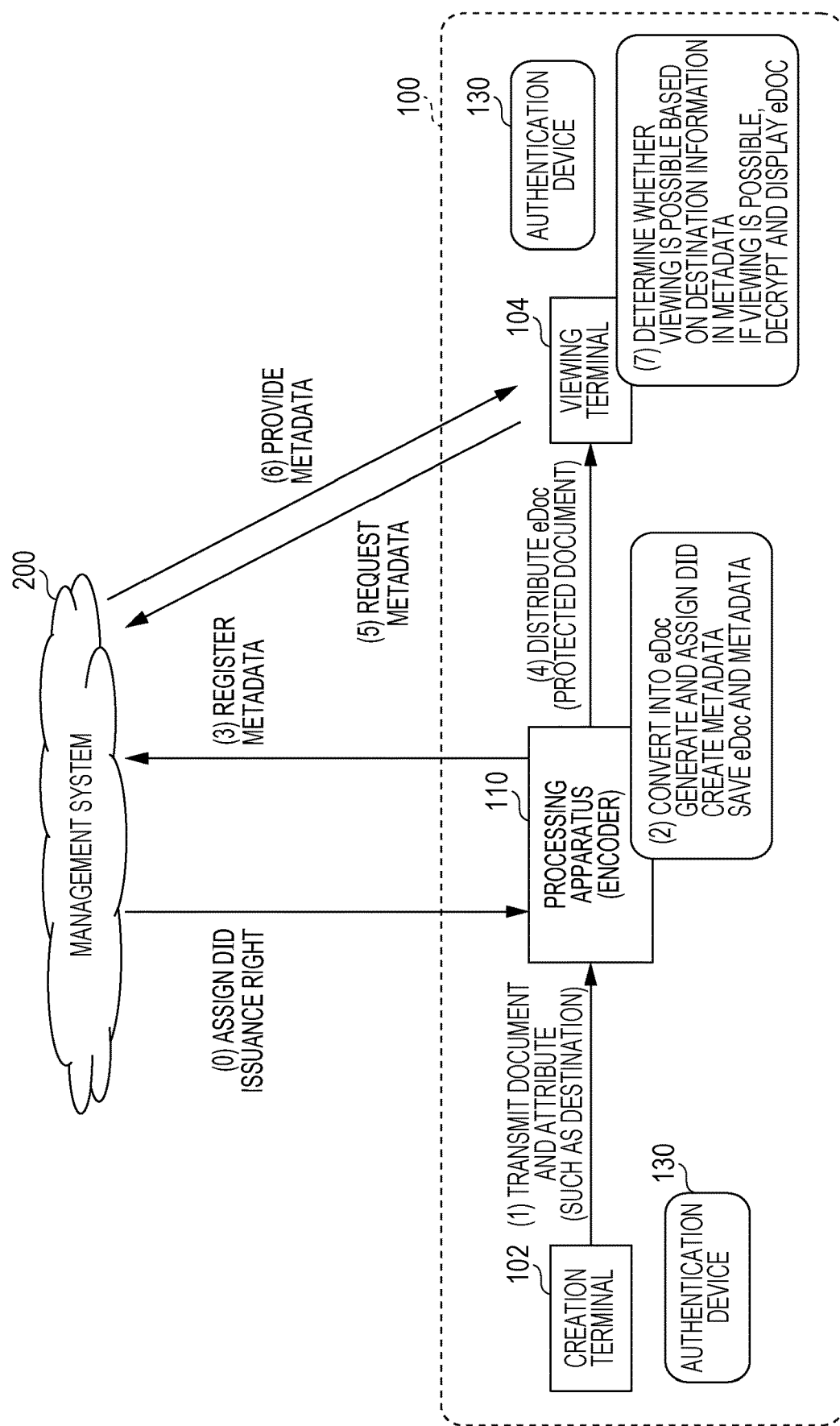
FIG. 2 illustrates an overview of distribution and viewing of a document using the document management system.

A mechanism according to this exemplary embodiment will be schematically described with reference to FIG. 2.

(0) The management system 200 (the DID server 220) assigns in advance the right to issue document IDs (DIDs) (hereinafter referred to as the "DID issuance right") and the issuance quota associated with the DID issuance right (the number of documents) to the processing apparatus 110 in the local system 100. The DID issuance right is not unlimitedly permitted but is limited by the issuance quota of the management system 200. That is, the processing apparatus 110 is capable of assigning DIDs based on the simultaneously assigned issuance right to a number of documents not exceeding the value indicated by the issuance quota assigned from the management system 200. When the issuance quota is used up, a new issuance right and issuance quota are assigned to the processing apparatus 110 by the management system 200.

(1) A user who desires to register (i.e., distribute) a document in the document management system according to this exemplary embodiment gives an instruction to the creation terminal 102 to register the document (for example, selects "registration" in an application menu). Upon receipt of the request, the creation terminal 102 requests user authentication. The authentication may be performed by entering a user ID and a password or may be performed by detecting (or reading) authentication information stored in the authentication device 130 with a card reader of the creation terminal 102. The user authentication may be performed by the creation terminal 102 or by the processing apparatus 110 in which the document is registered. Then, the user selects a document to be registered in the document management system from among the documents held in the creation terminal 102 and makes an instruction to register the selected document.

Upon receipt of the instruction from the user to register the document, the creation terminal 102 (more specifically, a registration process program installed in the creation terminal 102) accepts input of an item to be selected by the user (for example, the destination of the document) among items within the attribute data of the document. The designation of a combination of the user and the viewing terminal 104 as a destination may be accepted. In this case, if a combination of the user and a viewing terminal 104 used by the user to view the document matches a combination designated as a destination, the user is authorized to view the document.

The creation terminal 102 transmits the attribute data to the processing apparatus 110 together with the data of the document. The attribute data includes an attribute item input by the user, such as the destination, and other attribute items generated by the creation terminal 102, such as information on the registrant and the creation date and time. The creation terminal 102 may include a driver for converting documents in various formats created by various applications into a uniform format available for the viewing terminal 104. For example, the driver converts data indicating a still document image, such as word processor data, spreadsheet data, or CAD data, into a document written in a page description language in a way similar to that of a printer driver. For example, when the original data is audio data, the driver converts the audio data into data (a document) in a specific audio data format supported by the document management system according to this exemplary embodiment (in particular, the viewing terminal 104).

(2) The processing apparatus 110 performs a protection process on the document to be registered, which is received from the creation terminal 102, to generate a protected document (eDoc file). In this generation operation, the processing apparatus 110 encodes the received document into the format dedicated to the document management system according to this exemplary embodiment and encrypts the encoded data by using a generated encryption key to generate an eDoc file. The order of the encoding operation and the encryption operation may be reversed. Further, the processing apparatus 110 assigns a unique DID to the eDoc. The DID includes information (an issuance privilege key described below) used to prove that the DID is based on the issuance privilege provided by the management system 200, and information (an issuance certificate key described below) used to prove that the DID has been assigned by the processing apparatus 110. The data structure of the DID will be described below in conjunction with a detailed example. The assigned DID is embedded in the eDoc file (as an item in the properties of the file, for example).

Further, the processing apparatus 110 generates metadata corresponding to the generated eDoc file. The metadata includes attribute data received together with the document from the creation terminal 102 and the values of the attribute items generated by the processing apparatus 110, such as the DID, the ID of the processing apparatus 110, the encoding date and time, and encryption key information. The encryption key information included in the metadata is information indicating a key for unlocking the encrypted eDoc file. If a common key system is used for encryption, the encryption key information is information indicating a common key. If the common key itself is included in plaintext in the metadata, the common key may be stolen or intercepted and abused. To eliminate the concern about such abuse of the common key, the common key is encrypted using a public key for the destination user to produce encryption key information which is then included in the metadata.

Further, the processing apparatus 110 saves the generated eDoc file and metadata in an internal database.

(3) The processing apparatus 110 transmits the generated metadata to the management system 200 for registration. The management system 200 (the metadata server 230) saves the received metadata.

(4) The processing apparatus 110 distributes the generated eDoc file to the viewing terminal 104 designated as the destination. The distribution may be performed using a push or pull distribution system or using both distribution systems (for example, the eDoc file is distributed using the "push" method at the time of creation, and the viewing terminal 104 that fails to receive the eDoc file because of being inactive at that time receives the distributed eDoc file using the "pull" method). The distribution is performed via the local network 108 in the local system 100.

(5) The eDoc file received by the viewing terminal 104 is protected by encryption or the like and is not viewable as is. When the user desires to view the eDoc file on the viewing terminal 104, a card reader of the viewing terminal 104 detects (or reads) authentication information stored in the authentication device 130 of the user to authenticate the user. Then, the user gives an instruction on the screen of the viewing terminal 104 to view the eDoc file. Upon receipt of the instruction, the viewing terminal 104 accesses the management system 200 and requests the metadata of the eDoc file. This request includes the DID of the eDoc file.

(6) The management system 200 (the metadata server 230) transmits the most recent metadata of the eDoc file requested by the viewing terminal 104 to the viewing terminal 104.

(7) Upon receipt of the requested metadata from the management system 200, the viewing terminal 104 determines whether the destination information included in the metadata includes the combination of the viewing terminal 104 and the user who is currently using the viewing terminal 104 (the user has been authenticated using the authentication device 130). If the combination is not included, the user does not have the privilege to view the eDoc file on the viewing terminal 104. Thus, the viewing terminal 104 does not open the eDoc file and displays an error message indicating that the user does not have the viewing privilege. If the combination is included, the user has the privilege to view the eDoc file on the viewing terminal 104. In this case, the viewing terminal 104 decrypts the eDoc file by using the encryption key information included in the metadata and displays the eDoc file on a screen (that is, the viewing terminal 104 outputs the eDoc file in a manner corresponding to the information content regarding the eDoc file).

The metadata may include a period of expiry. The period of expiry is determined by, for example, adding a prescribed expiration period or an expiration period specified by the distributor or any other person to the date and time when the metadata was transmitted. After the metadata has expired, the viewing terminal 104 is not able to open (decrypt and display) the eDoc file unless the viewing terminal 104 acquires the metadata from the management system 200 again. The viewing terminal 104 having the capability of communicating with the processing apparatus 110 or the management system 200 acquires the most recent metadata available as of the time of designation of the eDoc file as a target to be viewed from the processing apparatus 110 or the management system 200 and determines whether viewing is possible on the basis of the most recent metadata.

After metadata is initially registered in the management system 200, destination information or access privilege information included in the metadata may be changed by the distributor or a person who is given the privilege to change the destinations (for example, a person who has the privilege to edit data). Even a user designated as a destination when an eDoc is created and registered may be removed from a destination list due to a later change. In this case, the viewing terminal 104 senses the removal of the user from the destination list by using the destination information included in the most recent metadata acquired from the management system 200 and does not display the eDoc file.

Next, an example of the data content of metadata 300 of an eDoc file will be described with reference to FIG. 3.

Of the items included in the metadata 300, the "DID" specifies a document ID assigned by the processing apparatus 110 that has generated the eDoc file. The "document name" specifies the name or title of the eDoc file.

The "distributor ID" specifies the user ID of a person (hereinafter referred to as a distributor) who has distributed the eDoc file, that is, a person who has registered a document in the processing apparatus 110 by using the creation terminal 102 and has distributed the document via the processing apparatus 110.

The "encoding date and time" specifies the date and time when the document obtained from the creation terminal 102 was encoded (protection process) and an eDoc file of the document was created. The "processing apparatus ID" specifies identification information of the processing apparatus that has executed the protection process. The "encryption information" specifies information concerning encryption for generating the eDoc file, and the information includes the name of encryption software used for encryption, the version of the encryption software, and key information indicating a key for unlocking encryption (decryption). The key information is obtained by, for example, encrypting the key for decryption by using a public key for each destination user. The "keyword information" specifies a list of keywords extracted from the eDoc file (or original data). The keyword information is used to search for the eDoc file, for example.

The "destination information" specifies information indicating a user and a viewing terminal designated as the distribution destination of the eDoc file by the distributor. In the example illustrated in FIG. 3, the destination information includes, for each destination user, the user ID of the user and the ID (identification information) of the viewing terminal 104 to be used by the user for viewing. Multiple viewing terminals 104 available for the user to view the eDoc file may be specified. In this case, combinations of the user ID of the user and the IDs of the multiple viewing terminals 104 are included in the destination information.

In another example, a destination user may be able to view the eDoc file by using any of the viewing terminals 104 designated as destinations. In this case, the destination information includes a list of IDs of destination users and a list of IDs of viewing terminals 104 designated as destinations. Candidate viewing terminals 104 designated as destinations may be, for example, but not limited to, a terminal shared in a department, terminals installed in a room for a department, and terminals installed in meeting rooms. It is unknown which user in the organization uses a shared terminal or a terminal installed in a room (which may be a shared terminal), whereas the types of these terminals are known at least by the distributor. It is also known that such terminals are less likely to be taken out of the organization without permission. Thus, these terminals are suitable as destinations to which a confidential document is distributed. In this way, a destination user may be allowed to use any of the viewing terminals 104 designated as destinations so long as an eDoc is used on such shared terminals whose identity has been verified.

The "access privilege information" specifies information indicating the privilege to use the eDoc file which is assigned to the destination user by the distributor.

The "offline expiration period" specifies information indicating the length of the expiration period of the metadata. That is, even in a state where the viewing terminal 104 fails to access the management system 200 (offline state), when metadata acquired and cached during the previous viewing of the eDoc file is present and when the "offline expiration period" from the date and time of acquisition of the metadata has not passed, the viewing terminal 104 decrypts and displays the eDoc file by using the encryption key information in the metadata. In contrast, in the offline state, if the offline expiration period in cached metadata of an eDoc file to be viewed has passed, the viewing terminal 104 does not decrypt or display the eDoc file. Within a period during which the viewing terminal 104 is able to access the management system 200 (i.e., the viewing terminal 104 is kept online), in response to an instruction given from a user to view an eDoc file, the viewing terminal 104 acquires the most recent metadata of the eDoc file from the management system 200 (in particular, the metadata server 230) for use.

The "original data information" specifies information indicating whether the original data before the eDoc file was generated (encoded) has been saved, and, if the original data has been saved, information (for example, Uniform Resource Locator (URL)) indicating the location where the original data is saved. The original data is either or both of a document (that has not been subjected to a protection process) sent from the creation terminal 102 to the processing apparatus 110 and application data (for example, if the document is page description language data, word processor software data before conversion into the data) on which the document is based, for example.

The "document acquisition date and time" specifies the date and time when the viewing terminal 104 acquired the file of the eDoc body data (i.e., the eDoc file). The "metadata acquisition date and time" specifies the date and time when the viewing terminal 104 acquired the currently cached most recent metadata of the eDoc file from the management system 200. The document acquisition date and time and the metadata acquisition date and time are not included in the metadata held in the management system 200, and are added by the viewing terminal 104 for its management to the metadata acquired from the management system 200.

Figure 3:
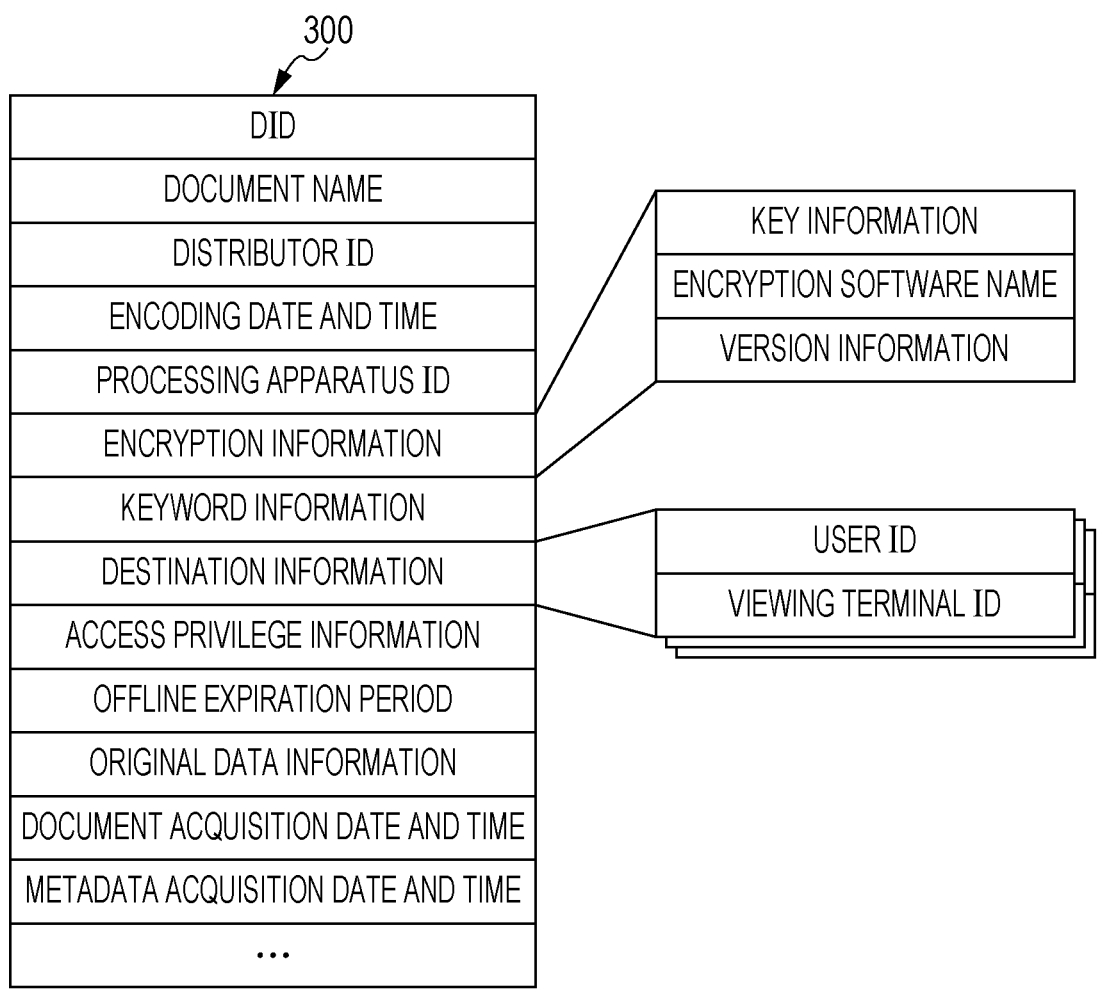
FIG. 3 exemplarily illustrates data content of metadata.

Of the items in the metadata illustrated in FIG. 3, the items of information generated by the processing apparatus 110 are a DID, an encoding date and time, a processing apparatus ID, encryption information, and keyword information. The document name, the distributor ID, the destination information, the access privilege information, the offline expiration period, and the original data information derive from the document or the attribute data sent from the creation terminal 102 to the processing apparatus 110.

Next, the data information content managed by the servers 210 to 240 in the management system 200 will be exemplarily described.

Figure 4:
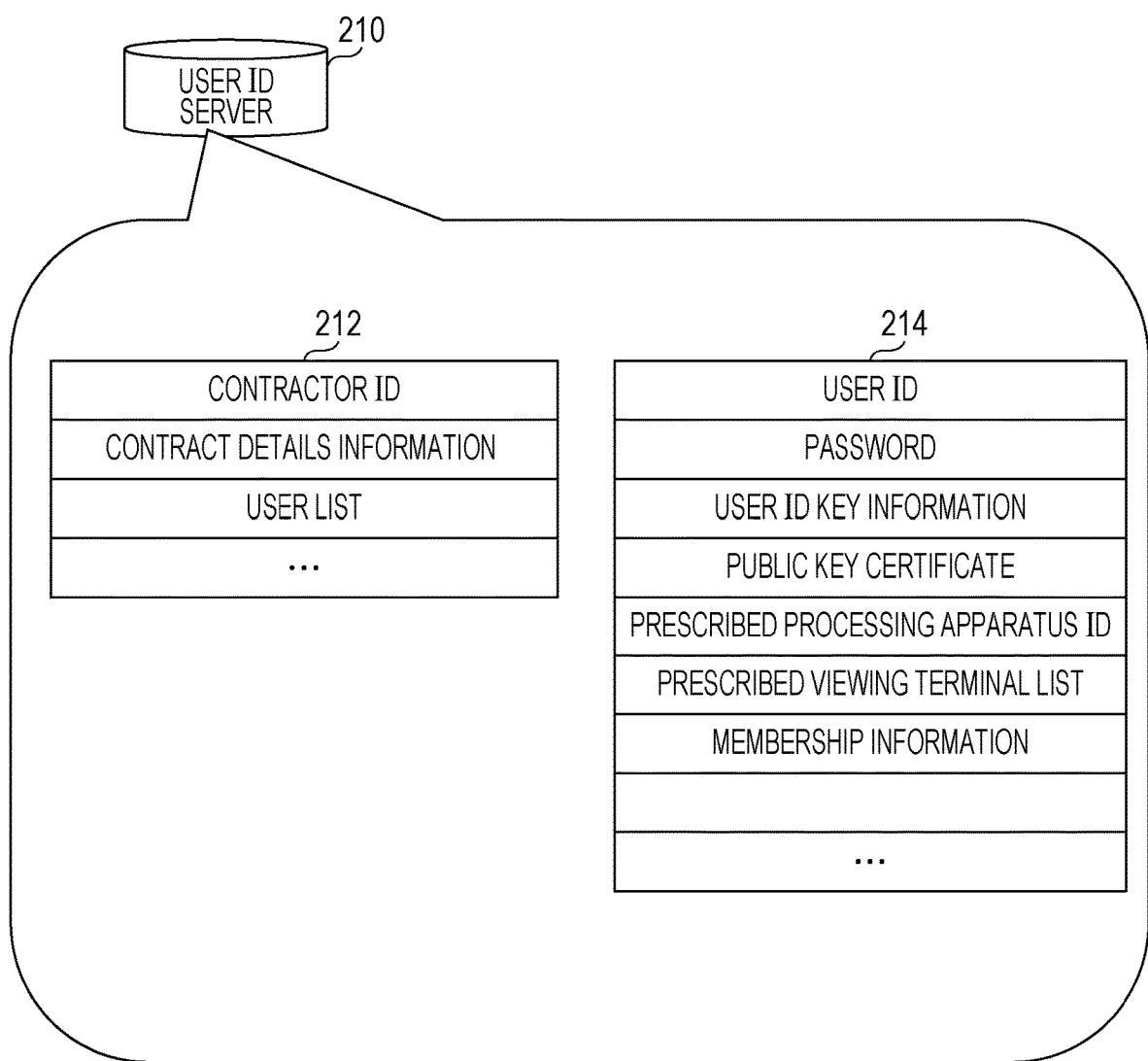
FIG. 4 exemplarily illustrates data content managed by a user ID server.

First, an example of the data content managed by the user ID server 210 will be described with reference to FIG. 4. The user ID server 210 stores contractor data 212 of each contractor and user data 214 of each general user.

The contractor data 212 includes a contractor ID, contract details information, and a user list. The contractor ID is identification information of a contractor (for example, an organization or a department in the organization) who has entered into a contract with the operator of the document management system. The user list is a list of user IDs of general users (for example, members belonging to the contractor, namely, the organization) who use the document management system under the contract made by the contractor.

The user data 214 of each general user includes the user ID of the general user, a password, user ID key information, a public key certificate, a prescribed processing apparatus ID, a prescribed viewing terminal list, and membership information. The user ID key information is authentication information of the user, which is used by the authentication device 130 of the user. The public key certificate is a digital certificate used to verify a public key for the user. The prescribed processing apparatus ID is the ID of the processing apparatus 110 in which the user has been registered. A user is typically registered in a processing apparatus 110 placed in an office to which the user belongs, and the processing apparatus 110 is the prescribed processing apparatus for the user. The prescribed viewing terminal list is a list of IDs of one or more viewing terminals that the user often uses. The viewing terminals included in this list are candidate destination terminals when the eDoc is distributed to the user. The membership information is information identifying the organization, the department, or the like to which the user belongs and specifies, for example, the contractor ID of the organization or department.

Next, an example of the data content managed by the DID server 220 will be described with reference to FIG. 5.

Figure 5:
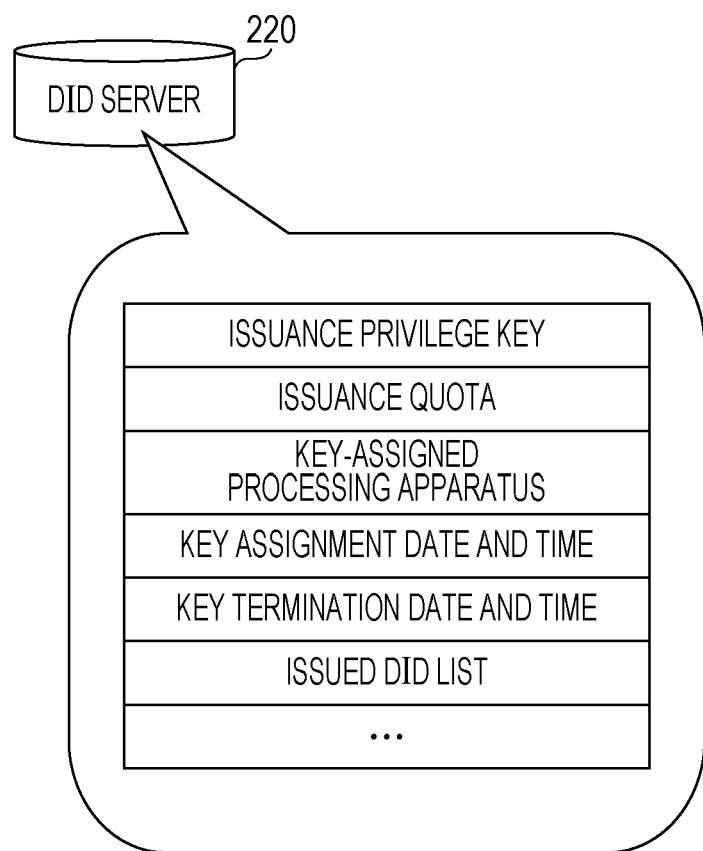
FIG. 5 exemplarily illustrates data content managed by a DID server.

As illustrated in FIG. 5, the DID server 220 holds, for each issuance privilege key issued to a processing apparatus, information on the following items: an issuance quota, a key-assigned processing apparatus, a key assignment date and time, a key termination date and time, and an issued DID list.

The issuance privilege key is key information (for example, a randomly generated character string) used to verify the DID issuance privilege assigned to the processing apparatus 110 by the DID server 220. The issuance privilege key assigned by the DID server 220 is included in a DID issued by the processing apparatus 110 to prove that the DID has been issued under the authorized issuance privilege.

The issuance quota is assigned to the processing apparatus 110 together with the issuance privilege key and is an upper limit of DIDs that can be issued (the maximum number of documents that can be assigned DIDs). When the pair of issuance privilege key and issuance quota is assigned by the DID server 220, the processing apparatus 110 is able to assign a unique DID to each of eDoc files up to the upper limit indicated by the issuance quota.

The key-assigned processing apparatus indicates the ID of the processing apparatus 110 to which the issuance privilege key (and the issuance quota) is assigned. The key assignment date and time is the date and time when the issuance privilege key was assigned to the processing apparatus 110. The key termination date and time is the date and time when the key-assigned processing apparatus 110 terminated use of the issuance privilege key. That is, the key termination date and time is the date and time when the processing apparatus 110 completed assignment of a number of DIDs equal to the upper limit indicated by the issuance quota assigned together with the issuance privilege key to eDoc files. In a mechanism that allows the processing apparatus 110 to request the DID server 220 after using up the issuance quota to assign the next issuance privilege key and issuance quota, the key termination date and time of a certain issuance privilege key (referred to as a first key) is not explicitly recorded but the key assignment date and time when an issuance privilege key subsequent to the first key was assigned to the processing apparatus 110 may be used as the key termination date and time of the first key. The issued DID list is a list of DIDs issued by the key-assigned processing apparatus 110 using the issuance privilege key and the issuance dates of the DIDs. Each time the key-assigned processing apparatus 110 issues a DID using the issuance privilege key, the processing apparatus 110 reports the DID to the DID server 220, and the DID server 220 adds the reported DID and the issuance date of the DID to the issued DID list corresponding to the issuance privilege key included in the DID.

The metadata server 230 stores metadata of an eDoc file sent from each processing apparatus 110. The data content of the stored metadata is similar to that exemplarily illustrated in FIG. 3. Note that the metadata server 230 does not manage the items used by only the viewing terminal 104, such as the document acquisition date and time and the metadata acquisition date and time, among the items of the metadata exemplarily illustrated in FIG. 3.

Next, data managed by the processing apparatus management server 240 will be described with reference to FIG. 6. The processing apparatus management server 240 stores, for each processing apparatus 110 to be managed, a status history 242 of the processing apparatus 110. The status history 242 includes, in association with the ID of the processing apparatus 110, information on the status 244 of the processing apparatus 110 as of the time of creation and update (creation/update date and time).

The status 244 as of each point in time includes an installation location, a contractor ID, an administrator name, an administrator contact, a registered user list, software information 246, hardware information 248, an available disk space, and security certificate information. The installation location is information indicating the location where the processing apparatus 110 is placed, and includes information such as the address, the building name, and the floor. The contractor ID is the ID of a contractor who uses the processing apparatus 110. The administrator name is the name of the administrator of the processing apparatus 110. The administrator is a user who manages the processing apparatus 110 in the department or the like in which the processing apparatus 110 is placed. The administrator contact is information (for example, the electronic mail address) on the contact of the administrator. The registered user list is a list of user IDs of users registered in the processing apparatus 110 (in other words, users for whom the processing apparatus 110 is designated as the "prescribed processing apparatus").

The software information 246 includes an encoding software name, an encoding software version, an encryption software name, an encryption software version, and the names and versions of other pieces of software installed in the processing apparatus 110. The encoding software is software for converting (encoding) a document input from the creation terminal 102 into a dedicated format of the document management system. The encryption software is software for encrypting a document (for example, a document obtained as a result of conversion into the dedicated format).

The hardware information 248 includes the following items: encoder circuit information, an encoder circuit FW version, the manufacturer name of the processing apparatus 110, and so on. The encoder circuit information is information indicating the model name of the hardware circuit used in the encoding process. The encoder circuit FW version is the version of the firmware (FW) of the encoder circuit.

The available disk space is the available space of a secondary storage device such as a hard disk or a solid-state disk of the processing apparatus 110 as of that point in time.

The security certificate information is information identifying security certificates installed in the processing apparatus 110 as of that point in time, such as the subject identifier and issuer identifier of each certificate and the date and time of issuance of the certificate.

Although not illustrated to avoid complexity, the status 244 further includes font types (a list of font names) installed in the processing apparatus 110, an address (for example, Internet protocol (IP) address) used for network communication, the device ID of a secondary storage device (such as a hard disk drive) included in the processing apparatus 110, information indicating the content of customization to connect the processing apparatus 110 to a processor in an infrastructure system of the organization in which the processing apparatus 110 is placed, the date and time of installation of an encryption key used by the processing apparatus 110 (for communication path encryption, signature, or the like), and so on.

Figure 7:
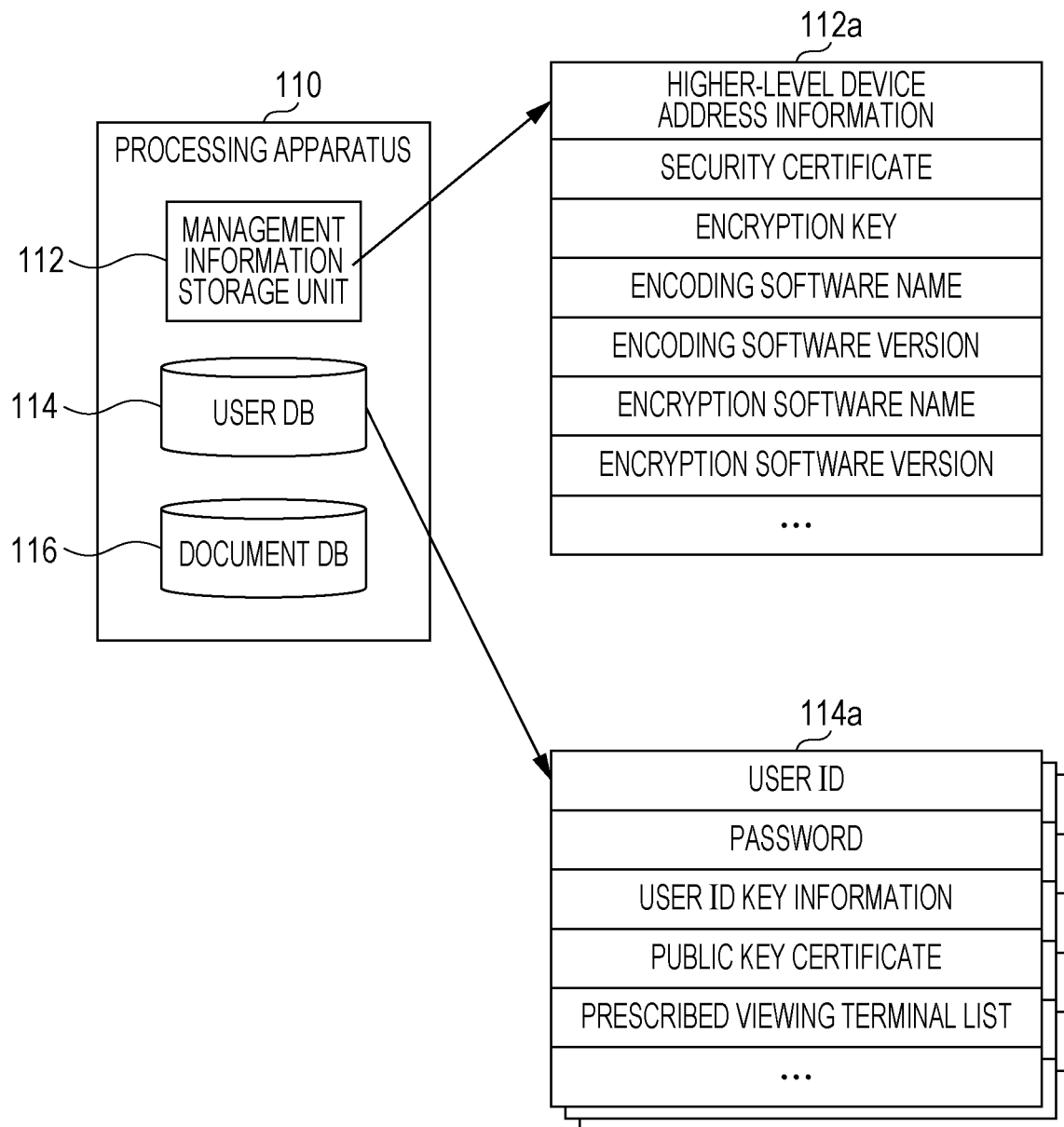
FIG. 7 exemplarily illustrates the configuration of a processing apparatus and data content stored in the processing apparatus.

Next, databases held by the processing apparatus 110 will be described with reference to FIG. 7. As illustrated in FIG.

7, the processing apparatus 110 includes a management information storage unit 112, a user database (DB) 114, and a document DB 116.

The management information storage unit 112 stores management information 112a. The management information 112a includes the following items: higher-level device address information, a security certificate, an encryption key, an encoding software name, an encoding software version, an encryption software name, an encryption software version, and so on. The higher-level device address information is information indicating the respective communication addresses (such as the IP address or the URL) of higher-level devices that manage the processing apparatus 110. Examples of the higher-level devices include the management system 200, the servers 210 to 240 in the management system 200, an in-house management system 150, and servers 152 to 156 in the in-house management system 150 described below. The security certificate is a digital certificate used by the processing apparatus 110 for secure communication with other devices on a network in accordance with the public key infrastructure. The processing apparatus 110 holds security certificates of higher-level devices with which the processing apparatus 110 frequently communicates. The processing apparatus 110 may hold security certificates of users who use the creation terminal 102 or the viewing terminal 104. The encryption key is an encryption key for the processing apparatus 110, which is used by the processing apparatus 110 for purposes such as encryption and decryption during communication with other devices on a network or digital signature (or the generation of its relevant verification information) by the processing apparatus 110, and includes a pair of secret key and public key assigned to the processing apparatus 110 in the public key infrastructure, for example. The encoding software and the encryption software are respectively pieces of software for encoding (conversion into the dedicated format) and encryption which are installed in the processing apparatus 110.

The user DB 114 stores user information 114a on users registered in the processing apparatus 110 (in other words, users for whom the processing apparatus 110 is designated as the "prescribed processing apparatus"). The user information 114a on each registered user includes the following items: a user ID, a password, user ID key information, a public key certificate, a prescribed viewing terminal list, and so on. These items have been described in the description of the data included in the user ID server 210 described above (see FIG. 4).

The document DB 116 stores an eDoc file generated by the processing apparatus 110 and metadata corresponding to the eDoc file. The eDoc file and the metadata include information of the DID and are associated with each other. The document DB 116 may store the original data before being encoded into an eDoc (the original data received from the creation terminal 102) in association with the DID of the eDoc.

Each of the creation terminal 102 and the viewing terminal 104 stores, for each user who uses the terminal, authentication information (such as the user ID and the password) of the user, the ID of the prescribed processing apparatus, address information of the prescribed processing apparatus, address information of a higher-level device (for example, the management system 200 or the in-house management system 150 described below), security certificates of the prescribed processing apparatus and the higher-level device, an encryption key used for communication path encryption, and so on.

Process Flow in System

When the processing apparatus 110 is placed on the local network 108, a maintenance person who performs maintenance of the processing apparatus 110 registers in the processing apparatus 110 information on users who use the processing apparatus 110 and information on the creation terminals 102 or the viewing terminals 104 that are likely to be used by the users. The registered information on the users is transferred to and also registered in a higher-level device, namely, the user ID server 210 (or a local user ID server 152 described below). If the number of users who use the processing apparatus 110 increases or decreases after the processing apparatus 110 has been placed, the maintenance person additionally registers information on a new user in the processing apparatus 110 or deletes information on a user who no longer uses the processing apparatus 110 from the processing apparatus 110. The addition and deletion of a user are reported to the higher-level device such as the user ID server 210, and the information held by the higher-level device is updated accordingly. The maintenance person also installs into each of the creation terminals 102 software (for example, a device driver of the processing apparatus 110) for requesting the processing apparatus 110 to register and distribute a document. The maintenance person also registers in each of the viewing terminals 104, for example, information (such as an apparatus name, a communication address, and wireless access settings) for communicating with the processing apparatus 110.

Next, a process flow for the registration and distribution of a document via the document management system according to this exemplary embodiment will be described with reference to FIG. 8.

(1)-1: In response to an instruction given by a user (distributor) to the creation terminal 102 to register a document, the creation terminal 102 displays a screen for prompting the user to input login authentication information (for example, a user ID and a password or authentication information stored in the authentication device 130). When the distributor inputs authentication information in accordance with the request, the creation terminal 102 transmits the authentication information to the processing apparatus 110 via the local network 108.

(1)-2: Upon receipt of the login authentication information, the processing apparatus 110 performs user authentication by using the information. It is assumed here that the user authentication is successful (i.e., the distributor has been verified as an authorized user). In the illustrated example, login authentication is performed using a login ID and a password. If the creation terminal 102 supports communication with the authentication device 130, login authentication may be performed using the authentication device 130.

(2)-1: If the login authentication is successful, the user selects a document to be registered in the document management system (and to be distributed to other users) from among the documents held in the creation terminal 102 and makes an instruction to register the selected document in the processing apparatus 110. Then, software (for example, a device driver) for performing interface with the processing apparatus 110 is activated. The software accepts input of attribute data of the document from the user and transmits the accepted attribute data and the data of the document to the processing apparatus 110.

FIG. 9 illustrates an example of an input screen 400 for entering attribute data. The input screen 400 includes a destination user selection menu 402, a destination user list field 404, a destination terminal selection menu 406, a destination terminal list field 408, an access privilege setting field 410, an offline expiration period menu 412, and an option setting invoke button 414.

The destination user selection menu 402 is a pull-down menu in which a list of possible users to which the document can be distributed is provided. The possible users are users registered in the processing apparatus 110, and a list of IDs and names of the possible users may be acquired from the processing apparatus 110. Alternatively, the creation terminal 102 may acquire a list of users from the local user ID server 152 (see FIG. 12), described below, which manages information on users of the document management system who belong to an organization to allow the distributor to select a user registered in other processing apparatuses 110 within the organization as a destination. In this case, the destination user selection menu 402 shows users in such a manner that one of the processing apparatuses 110 in which each user is registered is distinguishable from the other processing apparatuses 110. For example, each user may be displayed in a different color or font depending on the processing apparatus 110 in which the user is registered. Alternatively, the menu may be hierarchically structured such that one of the processing apparatuses 110 is first selected to invoke a list of users registered in the processing apparatus 110 and then a user to be designated as a destination may be selected from the list. The destination user list field 404 shows a list of destination users selected by the user. When the distributor selects a destination user on the destination user selection menu 402 and presses an "Add" button to the right of the destination user selection menu 402, the user ID or user name of the selected destination user is added to the destination user list field 404. When the distributor selects a destination user in the destination user list field 404 and presses a "Delete" button to the right of the destination user list field 404, the selected destination user is deleted from the destination user list field 404 (i.e., the selected destination user is no longer a destination).

The destination terminal selection menu 406 is a pull-down menu in which a list of possible viewing terminals (viewers) 104 to which the document can be distributed is provided. The possible viewing terminals 104 are viewing terminals registered in the processing apparatus 110, and a list of IDs and names of the possible viewing terminals 104 may be acquired from the processing apparatus 110. Alternatively, for example, the processing apparatus 110 or the local user ID server 152 (see FIG. 12, described in detail below) may include a list of viewing terminals 104 within an organization which have been registered in the document management system, and the creation terminal 102 may present the list to the distributor to allow the distributor to select a viewing terminal 104 of a user registered in other processing apparatuses 110 within the organization as a destination. As in the destination user list field 404, the destination terminal list field 408 shows a list of destination viewing terminals 104 selected by the distributor in the destination terminal selection menu 406.

For each destination user, the destination viewing terminal 104 corresponding to the user may be designated. To achieve this designation, for example, each time a destination user is selected in the destination user list field 404, the creation terminal 102 may acquire a list of prescribed viewing terminals of the user from the processing apparatus 110 (or the local user ID server 152 or the user ID server 210) and set the list in the destination terminal selection menu 406. If the distributor does not explicitly select a destination viewing terminal 104 for the destination user, a specific prescribed viewing terminal in a list of prescribed viewing terminals associated with the user (for example, the prescribed viewing terminal at the top of the list) is automatically selected as the destination viewing terminal 104.

The access privilege setting field 410 is a field for setting the privilege of the destination user to access (use) the document. In the illustrated example, checkboxes for four privilege items to view, modify (edit), print, and copy the document are shown. The distributor checks the checkbox for an item granted to the destination user for the document.

The offline expiration period menu 412 is a pull-down menu showing a list of options of an offline expiration period to be set for the document. The distributor selects an offline expiration period to be set for the document to be currently registered in the system and distributed from among several options shown in the offline expiration period menu 412.

Figure 10:
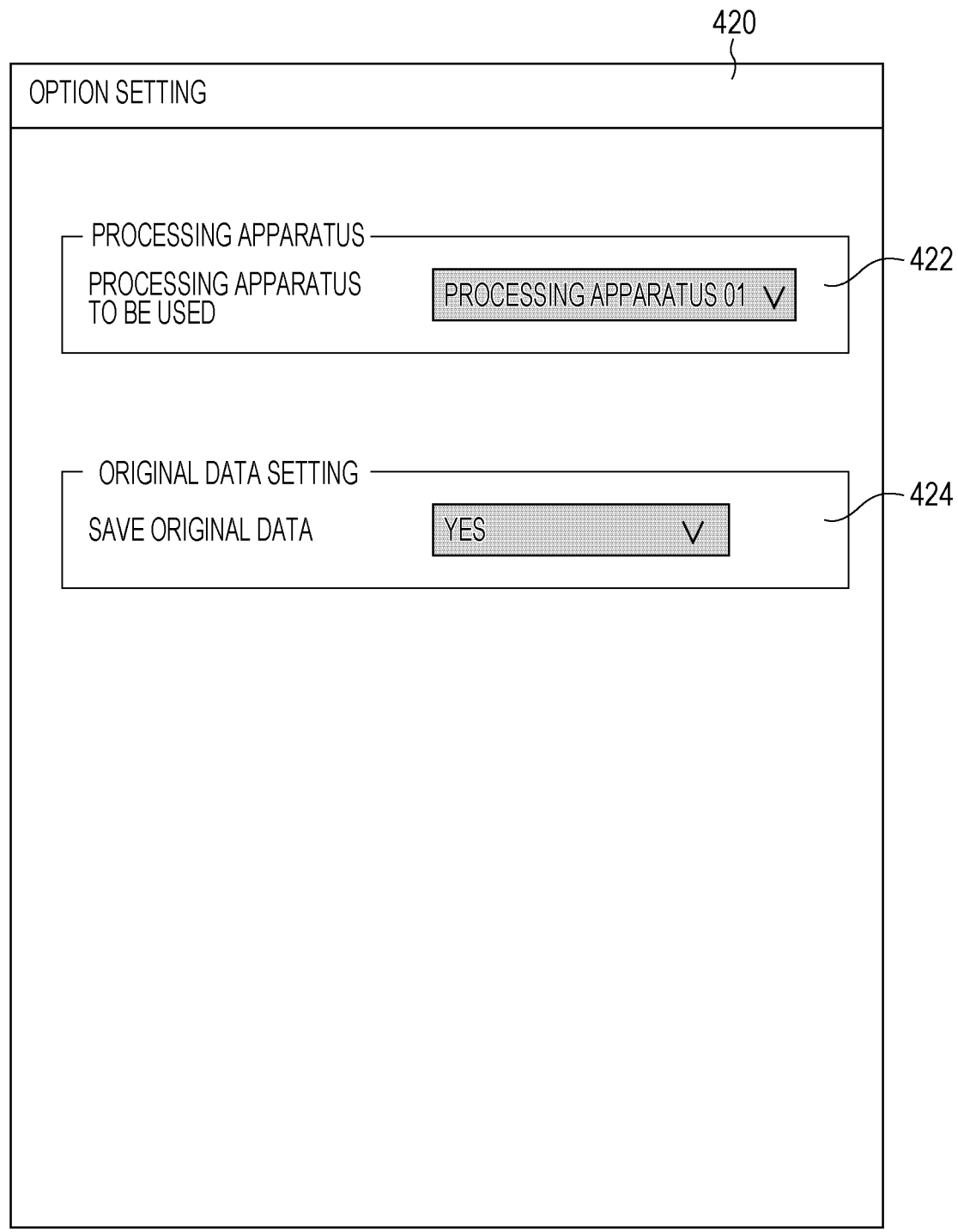
FIG. 10 illustrates an example option setting screen.

When the option setting invoke button 414 is pressed, the creation terminal 102 displays an option setting screen 420 exemplarily illustrated in FIG. 10. The option setting screen 420 includes a processing apparatus selection field 422 and an original data setting field 424. The processing apparatus selection field 422 includes a pull-down menu showing a list of possible processing apparatuses 110 to which the document can be transmitted. This menu includes a list of processing apparatuses 110 selectable by the creation terminal 102. The processing apparatuses 110 included in the list include a processing apparatus 110 (a single processing apparatus 110, typically, or multiple processing apparatuses 110) located in the local system 100 to which the creation terminal 102 belongs. The list may also include processing apparatuses 110 in other local systems 100 within the same organization. The original data setting field 424 shows a pull-down menu for accepting selection of whether the original data on which the eDoc is based is saved in the processing apparatus 110.

The attribute data sent from the creation terminal 102 to the processing apparatus 110 in step (2)-1 includes information set on the setting screens described above, such as destination information (a list of users and a list of viewing terminals), access privilege information, an offline expiration period, and original data information.

Figure 8:
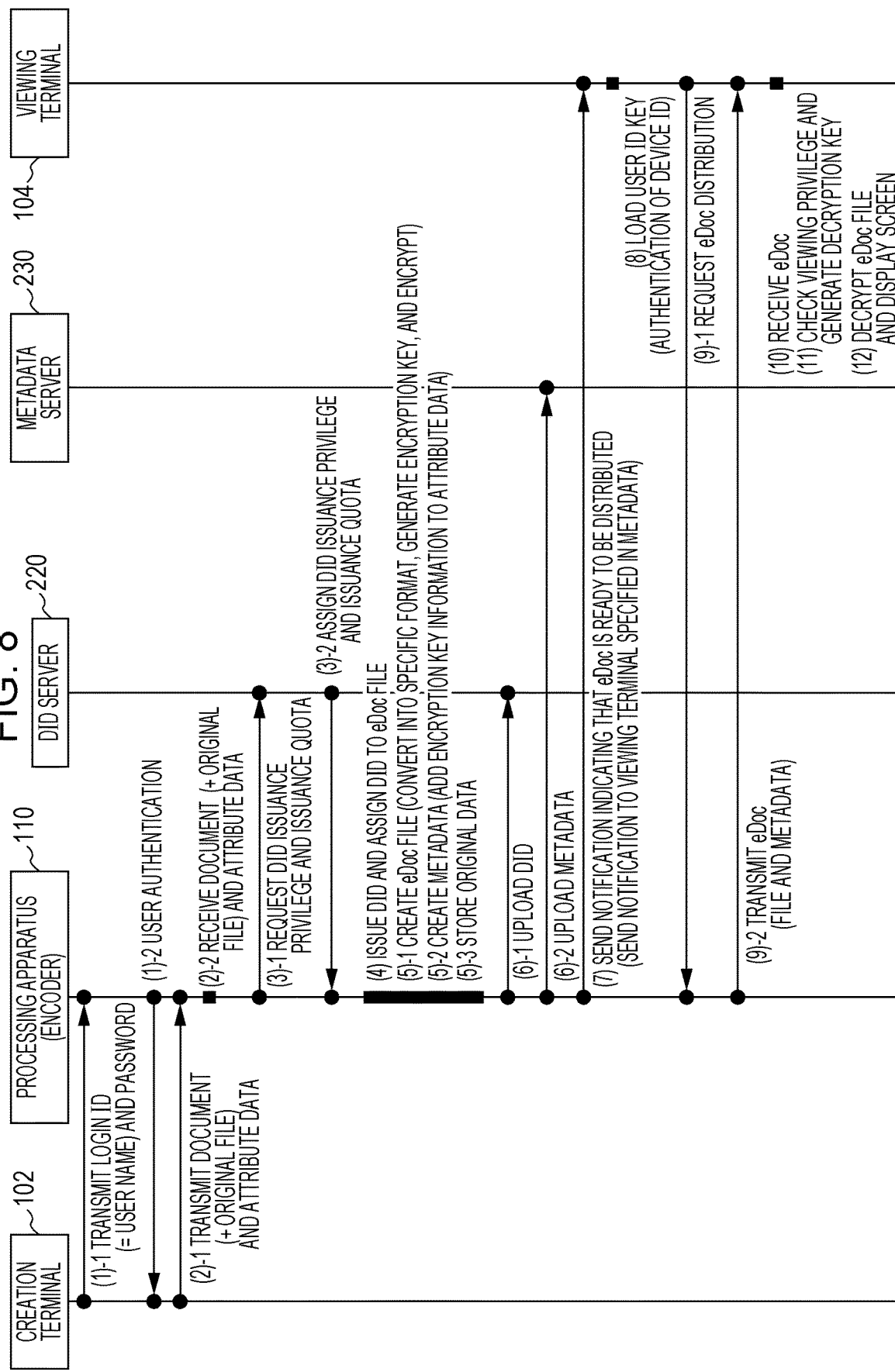
FIG. 8 illustrates a flow of document distribution and viewing in the document management system.

The description now returns to FIG. 8.

(2)-2: The processing apparatus 110 receives the document (referred to as the target document) and the attribute data from the creation terminal 102.

(3)-1: If the processing apparatus 110 has received no DID issuance privilege or issuance quota (or if the received issuance quota has been used up), the processing apparatus 110 requests the DID server 220 in the management system 200 to assign a new issuance privilege and issuance quota. If the received issuance quota has not been used up, the processing apparatus 110 does not make this request and the process proceeds to step (4).

(3)-2: In response to the request from the processing apparatus 110, the DID server 220 transmits a new issuance privilege and issuance quota to the processing apparatus 110.

(4) The processing apparatus 110 issues a DID by using the issuance privilege assigned by the DID server 220 and assigns the DID to an eDoc file generated from the target document (an eDoc file generated in the subsequent step).

(5)-1: The processing apparatus 110 generates an encryption key by using random numbers, for example. The encryption key is used to encrypt the target document. Further, the processing apparatus 110 converts the target document into an eDoc file. That is, the processing apparatus 110 encodes the target document into a format dedicated to the document management system and encrypts the encoded document by using the generated encryption key to generate an eDoc file. Information on the generated DID is included in the generated eDoc file.

(5)-2: The processing apparatus 110 generates metadata of the generated eDoc file. That is, the processing apparatus 110 adds the generated DID, the encoding date and time, the ID of the processing apparatus 110, encryption information, and so on to the attribute data received from the creation terminal 102 to generate metadata (see FIG. 3). The encryption information includes key information on each destination user, which is obtained by encrypting the encryption key used for encryption by using the public key for the destination user.

(5)-3: Upon receipt of an instruction from the creation terminal 102 to store the original data, the processing apparatus 110 saves the document received from the creation terminal 102 (or application data on which the document is based).

(6)-1: The processing apparatus 110 uploads the generated DID to the DID server 220. The DID server 220 stores the DID uploaded from the processing apparatus 110.

(6)-2: The processing apparatus 110 uploads the generated metadata to the metadata server 230. The metadata server 230 stores the metadata uploaded from the processing apparatus 110.

(7) The processing apparatus 110 transmits a distribution preparation completion notification to each of the viewing terminals 104 to which the generated eDoc is to be distributed. The notification indicates that the eDoc is ready to be distributed. The notification includes the generated DID and information indicating the document name of the eDoc. The notification may include a thumbnail image of a representative page (a predetermined page such as the first page) of the eDoc.

Figure 11:
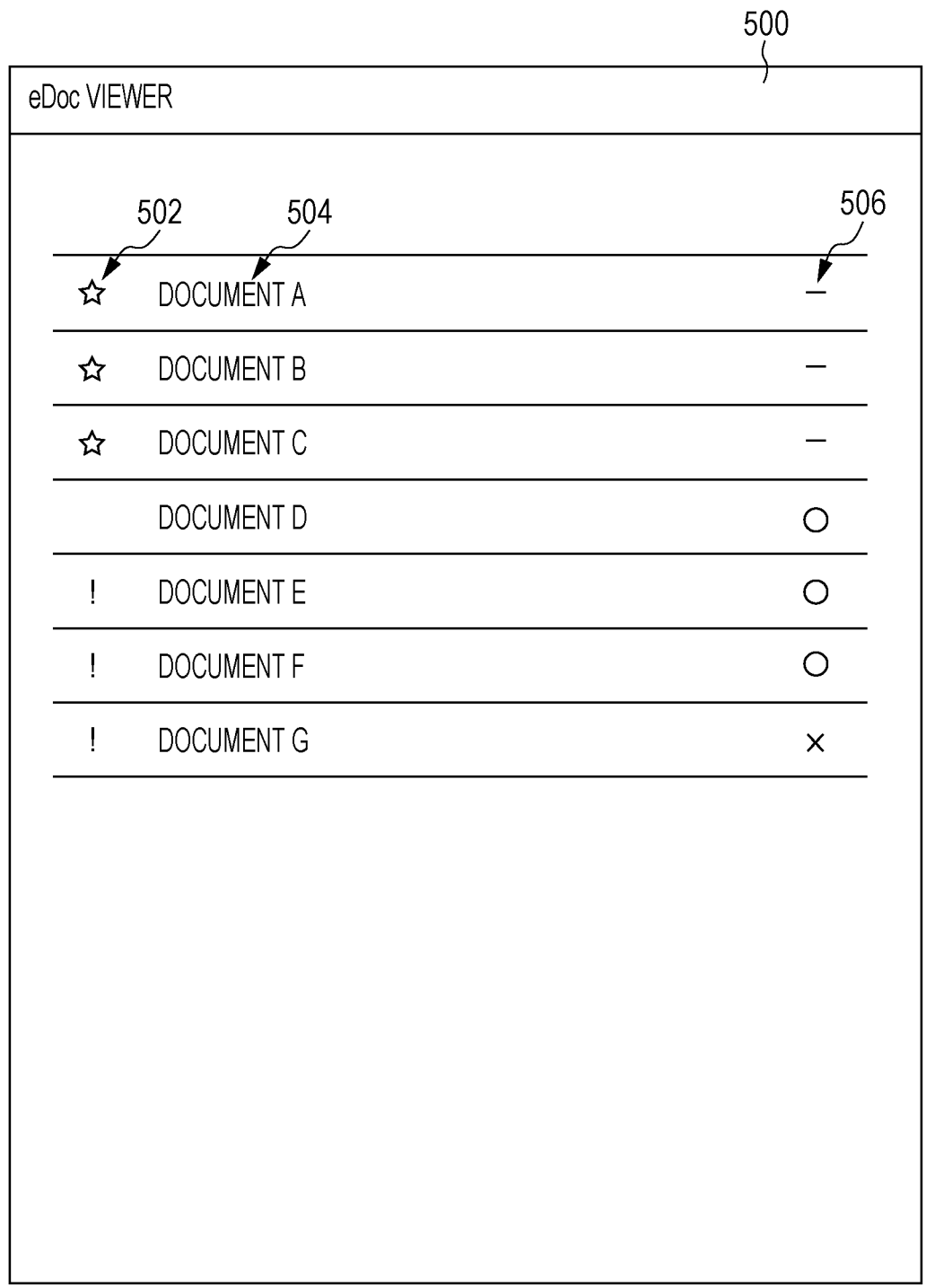
FIG. 11 illustrates an example list screen.

The card reader of the viewing terminal 104 detects (or reads) authentication information stored in the authentication device 130 of a user (referred to as a viewer) who is to use the viewing terminal 104 to authenticate the user. The viewing terminal 104 displays a list screen showing a list of eDocs distributed to the viewing terminal 104. FIG. 11 illustrates an example of a list screen 500. In the illustrated example, the list screen 500 includes, for each eDoc, a notification mark 502, a document name 504 of the eDoc, and a view-permission indication mark 506. The notification mark 502 is a mark used to notify the viewer of the state of the eDoc. Examples of the state of the eDoc indicated by the notification mark 502 include "recently added", "normal", and "expired". The "recently added" state is a state where a document distributed from the processing apparatus 110 has been received but not opened by the viewer. In FIG. 11, an eDoc in this state is marked with a hollow star ("☆"). In FIG. 11, an eDoc in the "normal" state is not given any mark. The "expired" state is a state where access to the document has expired. In FIG. 11, an eDoc in the "expired" state is marked with an exclamation mark ("!"). An eDoc in the "expired" state is not viewable until the most recent metadata of the eDoc is acquired from the processing apparatus 110 or the management system 200 even if the eDoc file has been saved in the viewing terminal 104. An eDoc in the "normal" state is viewable even if the viewing terminal 104 is being disconnected from the processing apparatus 110 or the management system 200 since access to the metadata of the eDoc saved (cached) in the viewing terminal 104 has not expired. The view-permission indication mark 506 indicates whether the combination of the viewing terminal 104 and the user (authenticated by the authentication device 130) who is using the viewing terminal 104 matches a combination of a destination user of the eDoc and the viewing terminal 104 that is specified in the metadata of the eDoc cached in the viewing terminal 104. If a match is found, the eDoc is viewable (a circle mark ("○") is given in FIG. 11). If no match is found, the eDoc is not viewable (a cross ("x") is given in FIG. 11). An eDoc for which a distribution preparation completion notification has been received but neither the eDoc file nor the metadata has been received is marked with a hyphen ("-") as the view-permission indication mark 506 indicating an undetermined state since the viewing terminal 104 does not have information on criteria for determining whether the combination of destinations is satisfied. In the illustrated example, the first three eDocs from the top are recently-added documents, whose eDoc bodies (files and metadata) have not been acquired, and are marked with the view-permission indication mark 506 indicating the undetermined state.

On the list screen (FIG. 11), the viewer selects the desired eDoc by touching it, for example, and makes an instruction to view the eDoc. It is assumed here that a recently-added eDoc (marked with a hollow star ("☆") as the notification mark 502) is selected as a target to be viewed.

(8) The description now returns to FIG. 8. The viewing terminal 104 acquires the eDoc file and the metadata of the selected target to be viewed from the processing apparatus 110 since none of them is held in the viewing terminal 104. Thus, the viewing terminal 104 transmits a user ID key that is authentication information acquired from the authentication device 130 of the viewer to the processing apparatus 110 on the local network 108 to which the viewing terminal 104 is connected. The processing apparatus 110 verifies whether the user ID key verifies the identity of any of the users registered therein (user authentication). It is assumed here that the user authentication is successful. If the user ID key received from the viewing terminal 104 does not verify the identity of any of the users registered in the processing apparatus 110, the processing apparatus 110 may send the user ID key to a higher-level device related to user authentication (the user ID server 210 or the local user ID server 152) and request the higher-level device to perform user authentication.

(9)-1: In response to successful user authentication at the processing apparatus 110, the viewing terminal 104 sends a distribution request including the DID of the eDoc to be viewed, which is selected by the viewer, to the processing apparatus 110.

(9)-2: The processing apparatus 110 returns the eDoc file and metadata corresponding to the DID included in the distribution request sent from the viewing terminal 104 to the viewing terminal 104.

(10) The viewing terminal 104 receives the eDoc file and metadata sent from the processing apparatus 110 and saves (caches) the received eDoc file and metadata.

(11) The viewing terminal 104 determines whether the combination of the viewing terminal 104 and the viewer who is currently using the viewing terminal 104 matches any of combinations of destination users and destination terminals indicated by the destination information in the metadata (see FIG. 3). If the combination does not match any of the combinations, the viewer is not allowed to view the eDoc file on the viewing terminal 104. In this case, the viewing terminal 104 displays an error message indicating that the eDoc file is not viewable. In this case, the viewing terminal 104 may delete the saved eDoc file (and the corresponding metadata). If it is determined that the combination of the viewing terminal 104 and the viewer who is currently using the viewing terminal 104 matches any of the combinations specified in the distributor information in the metadata, the viewing terminal 104 permits the viewer to view the eDoc. In this case, the viewing terminal 104 retrieves the key corresponding to the viewer from among the encrypted keys corresponding to the destination users included in the encryption information in the metadata and decrypts the retrieved key by using the secret key for the viewer (which is held by the authentication device 130, for example) to restore a decryption key necessary to decrypt the eDoc file.

(12) The viewing terminal 104 decrypts the eDoc file by using the restored decryption key to reproduce a viewable document, and outputs the document (for example, displays the document on the screen). Further, the viewing terminal 104 controls whether to accept from the viewer an instruction to perform an operation on the document, in accordance with the access privilege information included in the metadata. Fundamentally, the viewing terminal 104 does not save the decrypted document in a file. That is, after the document has been viewed, the eDoc file and the metadata are saved but the decrypted document is not saved in a non-volatile storage device of the viewing terminal 104.

Next, another example of the document management system according to this exemplary embodiment will be described with reference to FIG. 12. In the example illustrated in FIG. 12, multiple local systems 100 are located in an in-house network that is a private network in an organization such as an enterprise. An in-house management system 150 is also located in the in-house network. The in-house management system 150 manages processes performed within the organization among processes performed in the document management system and also manages information necessary for the processes. That is, the management system 200 is run by the service provider of the document management system and manages information and processes for multiple organizations that use the document management system, whereas the in-house management system 150 manages part of the information and processes which is related to the organization under management of the management system 200.

The in-house management system 150 includes a local user ID server 152, a local DID server 154, and a local metadata server 156.

The local user ID server 152 manages information on users registered as users in the document management system among the members of the organization. The information on individual users held by the local user ID server 152 is similar to the information on general users held by the user ID server 210 illustrated in FIG. 4. When a user who acquires and uses the processing apparatus 110 (i.e., a user for which the processing apparatus 110 is designated as the "prescribed processing apparatus") is registered in the processing apparatus 110, the processing apparatus 110 sends information on the registered user to the local user ID server 152 within the organization. The local user ID server 152 saves the received information on the user and sends the information to the user ID server 210 of the central management system 200 via the wide area network 10. The user ID server 210 stores the received information on the user. If the information on the user registered in the processing apparatus 110 is changed, the administrator or any other person causes the processing apparatus 110 to change the information on the user. The processing apparatus 110 transmits information on the changed content of the user information (including the user ID, the name of an item whose information is changed, and the changed value of the item, for example) to the local user ID server 152, and the local user ID server 152 changes the information on the user stored therein in accordance with the received changed content. Further, the local user ID server 152 sends information on the received changed content to the user ID server 210, and the user ID server 210 changes the held information on the user in accordance with the sent information.

The local DID server 154 receives and stores a DID issued by each of the processing apparatuses 110 in the local systems 100 belonging to the in-house network within the organization. The information held by the local DID server 154 is similar to the information held by the DID server 220 illustrated in FIG. 5. Further, the local DID server 154 sends information on the DID received from the processing apparatus 110 to the DID server 220, and the DID server 220 stores the information. Further, the local DID server 154 is assigned a DID issuance privilege and issuance quota by the DID server 220 and assigns a DID issuance privilege and issuance quota to each of processing apparatuses 110 managed by the local DID server 154 within the issuance quota on the basis of the issuance privilege.

The local metadata server 156 receives and stores metadata of eDocs generated by the processing apparatuses 110 in the local systems 100 belonging to the in-house network within the organization. The information held by the local metadata server 156 is similar to the information held by the metadata server 230. Further, the local metadata server 156 further sends the metadata received from the processing apparatuses 110 to the metadata server 230, and the metadata server 230 stores the metadata.

Figure 12:
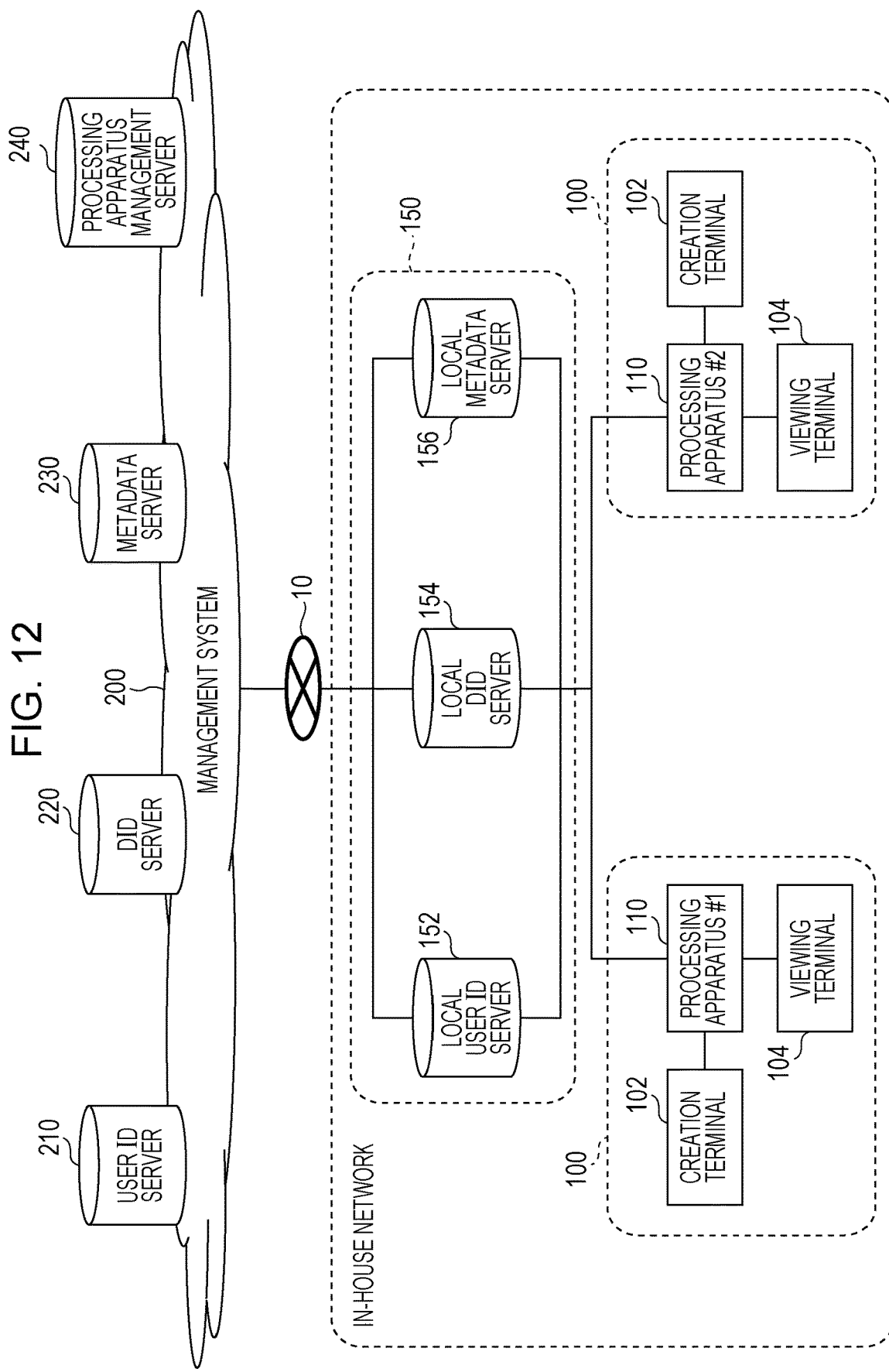
FIG. 12 illustrates an example system configuration including an in-house management system.

In the system illustrated in FIG. 12, upon receipt of a request from a user who has not been registered but has been registered in other processing apparatuses 110 within the same organization, such as a request for registering (and distributing) a document or a request for acquiring an eDoc file or metadata, the processing apparatus 110 responds to the request via the in-house management system 150.

Figure 13:
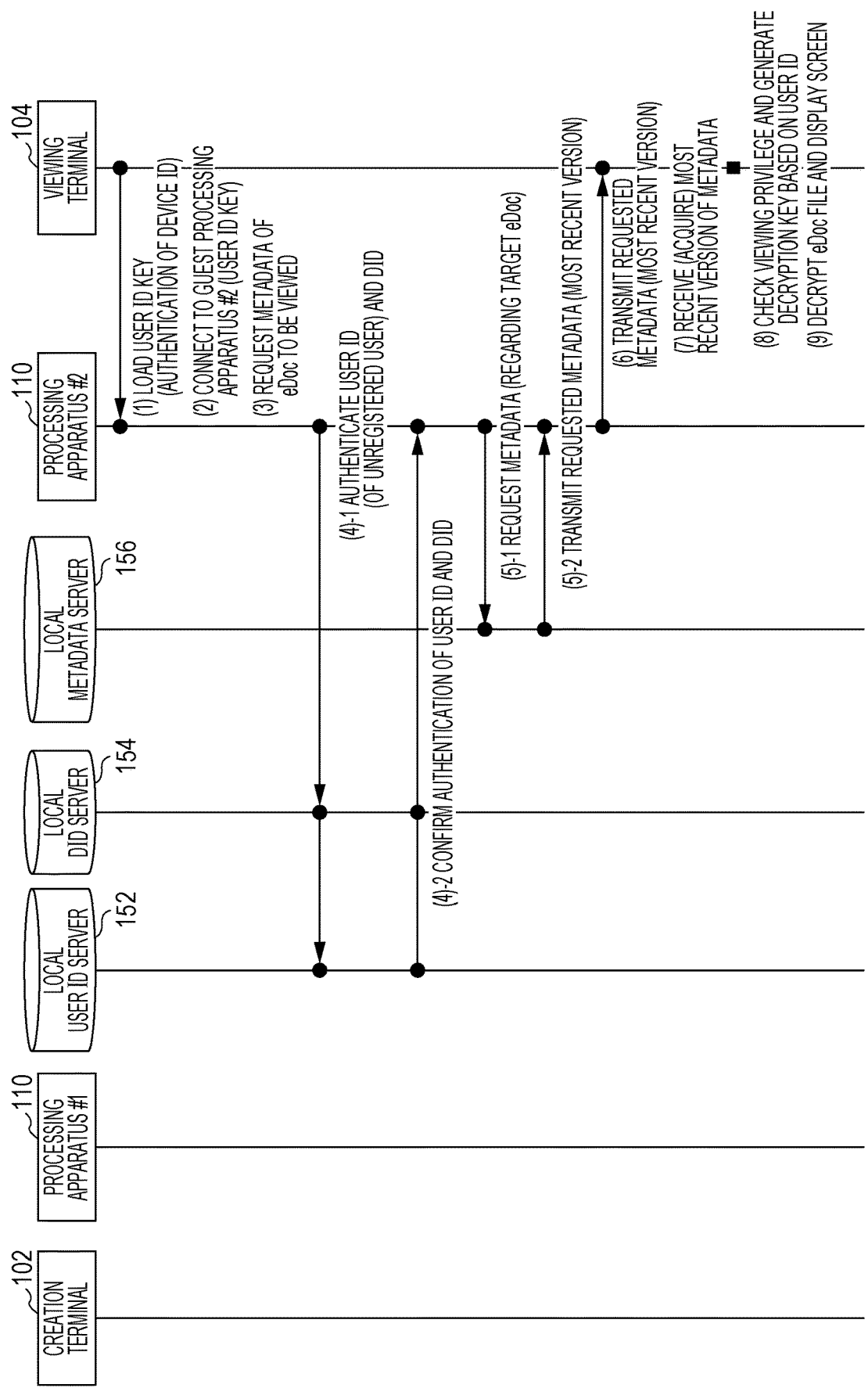
FIG. 13 illustrates an example process flow for a user to acquire metadata of a document and view the document by using a processing apparatus in which the user is not registered.

In an example, a viewer who has been registered in a processing apparatus #1 in a first local system 100 within a first department on the in-house network desires to save an eDoc registered and distributed from the processing apparatus #1 in their viewing terminal 104 and to then move to a second department managed by a processing apparatus #2 to view the eDoc. At this point in time, the metadata of the eDoc saved in the viewing terminal 104 is old (i.e., access to the eDoc has expired). In this case, in response to an operation performed by the viewer to open the eDoc on the viewing terminal 104, a process illustrated in FIG. 13 is performed.

First, the viewing terminal 104 searches for a processing apparatus 110 on the local network 108 in a second local system 100 to which the viewing terminal 104 is being connected. As a result, the processing apparatus #2 is found. The processing apparatus #2, which is different from the processing apparatus #1 that has distributed the eDoc, does not include the eDoc file or the metadata.

(1) The viewing terminal 104 loads a user ID key (authentication information) from the authentication device 130 of the viewer.

(2) The viewing terminal 104 transmits the user ID key acquired from the authentication device 130 to the processing apparatus #2 for user authentication to acquire the most recent metadata of the eDoc designated as the target to be viewed.

(3) The viewing terminal 104 requests the processing apparatus #2 to transmit the metadata of the eDoc. The request includes the DID of the eDoc.

(4)-1: The processing apparatus #2 checks whether the user ID key received from the viewing terminal 104 corresponds to any of the users registered therein (user authentication). In this example, the viewer has been registered in the processing apparatus #1 but has not been registered in the processing apparatus #2. Thus, the processing apparatus #2 sends an authentication request including the user ID key to a preset address of the local user ID server 152. The processing apparatus #2 further sends the DID included in the metadata request sent from the viewing terminal 104 to a preset address of the local DID server 154 for authentication.

(4)-2: The local user ID server 152 verifies whether the user ID key received from the processing apparatus #2 corresponds to any of the users registered therein (user authentication). The viewer who possesses the user ID key has been registered in the processing apparatus #1 and thus has also been registered as a user in the local user ID server 152, which is a higher-level device of the processing apparatus #1. Therefore, the user authentication is successful. The local user ID server 152 returns a response indicating that the authentication is successful to the processing apparatus #2.

The local DID server 154 checks whether the DID to be verified, which is sent from the viewing terminal 104, is an authorized DID, that is, whether the DID to be verified matches any of the DIDs saved therein. In this example, the DID of the eDoc has been issued by the processing apparatus #1 and has also been saved in the local DID server 154, which is a higher-level device of the processing apparatus #1 concerning the DID. Therefore, the DID is authenticated as being authorized. The local DID server 154 returns a response indicating that the DID is authenticated as being authorized to the processing apparatus #2.

(5)-1: Since the user authentication and the DID authentication are successful, the processing apparatus #2 continues a process for responding to the metadata request from the viewing terminal 104. That is, the processing apparatus #2 sends the metadata request including the DID to a preset address of the local metadata server 156.

(5)-2: Upon receipt of the metadata request from the processing apparatus #2, the local metadata server 156 returns the metadata corresponding to the DID included in the request to the processing apparatus #2. When the metadata of the eDoc is changed by the distributor on the processing apparatus 110, the change is immediately reflected in the corresponding metadata held by the local metadata server 156. Thus, the metadata returned to the processing apparatus #2 at this time is the most recent version of the metadata of the eDoc to be viewed.

(6) The processing apparatus #2 transmits the metadata received from the local metadata server 156 to the viewing terminal 104.

(7) The viewing terminal 104 receives the metadata from the processing apparatus #2 and saves (caches) the received metadata.

(8) The viewing terminal 104 refers to the destination information in the received most recent metadata and checks for privilege for the combination of the viewing terminal 104 and the viewer. That is, if the combination of the viewing terminal 104 and the viewer matches any of combinations of destination users and destination terminals indicated by the destination information (see FIG. 3), the viewing terminal 104 determines that the viewing privilege exists. Otherwise, the viewing terminal 104 determines that the viewing privilege does not exist. If it is determined that the viewing privilege does not exist, the viewing terminal 104 provides an error indication. If it is determined that the viewing privilege exists, the viewing terminal 104 retrieves the key corresponding to the viewer from among the encrypted keys corresponding to the destination users included in the encryption information in the metadata and decrypts the retrieved key by using the secret key for the viewer (the secret key is held by the authentication device 130, for example) to restore a decryption key necessary to decrypt the eDoc file.

(9) Then, the viewing terminal 104 decrypts the eDoc file by using the restored decryption key to reproduce a viewable document, and outputs the document (for example, displays the document on the screen). Then, the viewing terminal 104 controls whether to accept from the viewer an instruction to perform an operation on the document, in accordance with the access privilege information included in the metadata.

Next, a process flow when a user registered in the processing apparatus #1 in the first local system 100 goes to a second department managed by the processing apparatus #2 and registers a document in the document management system will be described with reference to FIG. 14. It is assumed that the user (the distributor of the document) has not been registered in the processing apparatus #2.

(1) When the user gives an instruction to their creation terminal 102 to register a document, the creation terminal 102 displays a screen for prompting the user to input login authentication information. When the distributor inputs authentication information (for example, a user ID and a password) in accordance with the request, the creation terminal 102 transmits the authentication information to the processing apparatus #2 via the local network 108.

(2) The processing apparatus #2 determines whether the authentication information received from the creation terminal 102 corresponds to any of the users registered therein. In this case, the distributor has not been registered in the processing apparatus #2. Thus, the processing apparatus #2 sends the authentication information to a higher-level device, namely, the local user ID server 152, for authentication.

(3) The local user ID server 152 determines whether the received authentication information corresponds to any of the users registered therein (user authentication). In this example, the distributor, who is a user registered in the processing apparatus #1, is also a user registered in the local user ID server 152. Therefore, the user authentication is successful. The local user ID server 152 returns information indicating that the user authentication is successful to the processing apparatus #2.

(4) Upon receipt of a response indicating successful authentication from the local user ID server 152, the processing apparatus #2 sends a response indicating that the user authentication is successful to the creation terminal 102.

(5) When the user authentication is successful, the creation terminal 102 sends the document selected by the user as an object to be registered and the attribute data input by the user to the processing apparatus #2.

(6) The processing apparatus #2 receives the document and the attribute data from the creation terminal 102.

(7)-1: If the DID issuance privilege and issuance quota have been used up, the processing apparatus #2 requests the local DID server 154 to assign a new issuance privilege and issuance quota. If the received issuance quota has not been used up, the processing apparatus #2 does not make this request and the process proceeds to step (8).

(7)-2: In response to the request from the processing apparatus #2, the local DID server 154 assigns a new issuance privilege and issuance quota to the processing apparatus #2. If the issuance quota assigned from the DID server 220 has been used up, the local DID server 154 requests the DID server 220 to assign a new issuance privilege and issuance quota. Using an issuance privilege and issuance quota assigned in response to this request, the local DID server 154 assigns a DID issuance right and issuance quota to the processing apparatus #2.

(8) The processing apparatus #2 issues a DID by using the assigned issuance privilege and assigns the DID to an eDoc file generated from the target document (an eDoc file generated in the subsequent step).

(9)-1: The processing apparatus #2 generates an encryption key for encrypting the target document, encodes the target document into a format dedicated to this system, and encrypts the encoded document by using the generated encryption key to generate an eDoc file.

(9)-2: The processing apparatus #2 generates metadata of the eDoc file by adding items such as the generated DID and the encoding date and time to the attribute data received from the creation terminal 102.

(10) The processing apparatus #2 uploads the generated DID to the local DID server 154 and uploads the generated metadata to the local metadata server 156. The local DID server 154 adds the DID uploaded from the processing apparatus #2 to the issued DID list (see FIG. 5) corresponding to the issuance privilege key included in the local DID server 154 and uploads the DID to the DID server 220. The DID server 220 adds the DID uploaded from the local DID server 154 to the issued DID list (see FIG. 5) corresponding to the issuance privilege key. Further, the local metadata server 156 stores the metadata uploaded from the processing apparatus #2 and uploads the metadata to the metadata server 230. The metadata server 230 stores the metadata uploaded from the local metadata server 156.

The processing apparatus #2 distributes the generated eDoc to a destination designated by the distributor. This process is similar to that of steps (7) to (12) in FIG. 8.

(11) Further, the processing apparatus #2 transmits the generated eDoc file and metadata to the creation terminal 102. The processing apparatus #2 may save the eDoc file and the metadata or delete the eDoc file and the metadata without saving them. If the eDoc file and the metadata are not saved but are deleted, the eDoc file and the metadata are saved in only the processing apparatus #1 designated as the prescribed processing apparatus in step (13) described below among the processing apparatuses 110 within the organization. Whether a processing apparatus 110 that is not designated as the prescribed processing apparatus of the distributor saves the eDoc file and the metadata registered and distributed in the request given by the distributor may be set in the processing apparatus 110.

(12) The creation terminal 102 saves the eDoc file and metadata received from the processing apparatus #2 to later transfer them to the processing apparatus #1, which is the prescribed processing apparatus of the distributor.

(13) When the distributor carries the creation terminal 102 and returns to the first department to which the distributor belongs, the creation terminal 102 searches for the processing apparatus #1, which is the prescribed processing apparatus of the distributor, on the local network 108 in the first local system 100. Upon finding the processing apparatus #1, the creation terminal 102 registers the eDoc file and metadata saved in step (12) described above to the processing apparatus #1. Accordingly, the distributor who desires to change the content of the metadata (for example, the destination) may access the prescribed processing apparatus, namely, the processing apparatus #1, and change the metadata.

In the document management system according to this exemplary embodiment described above, the body information (i.e., an eDoc file) of a document that the creation terminal 102 has instructed the processing apparatus 110 to distribute is stored in only the processing apparatus 110 and a destination viewing terminal 104 but is not delivered to other networks or devices. This configuration may minimize the risk of leakage of the eDoc file. In particular, limiting the distribution destination of the eDoc file to the viewing terminal 104 on the local network 108 within which the eDoc has been generated prevents the eDoc from being delivered outside the local network 108.

In contrast, the metadata of the eDoc is registered in the central management system 200 or the in-house management system 150 within each organization and is thus obtainable by the viewing terminal 104 via the wide area network 10 or a private network within the organization even when the viewing terminal 104 moves to various locations. Upon receipt of an instruction from the user to view the eDoc, the viewing terminal 104 acquires the most recent metadata of the eDoc from the in-house management system 150 or the central management system 200 and determines whether to permit the user to view the eDoc on the basis of the destination information included in the most recent metadata. The user, who is designated as a destination when the eDoc is registered or distributed, is not permitted to view the eDoc if the user is removed from the destination list due to a later change of the destination list.

Figure 14:
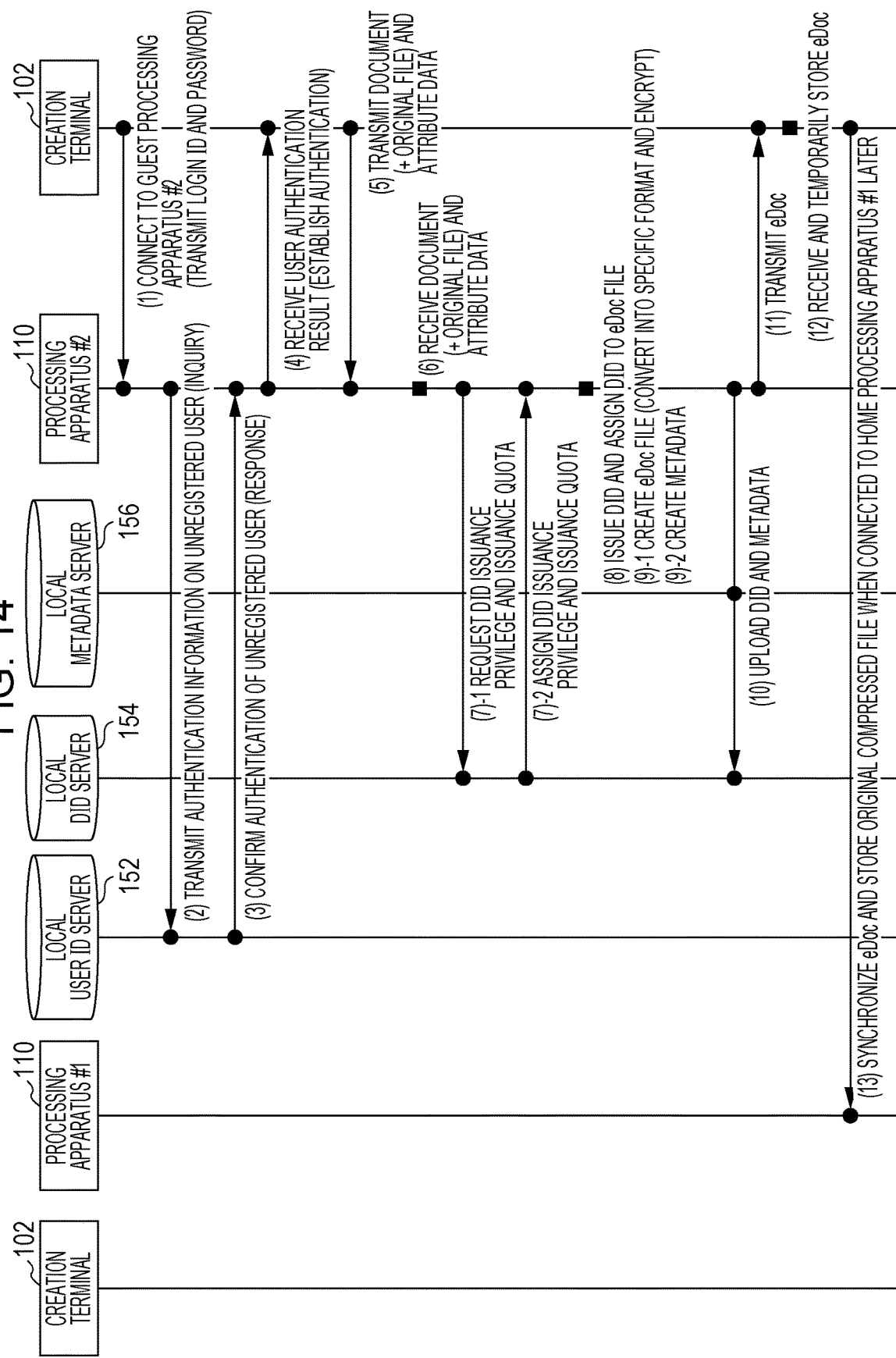
FIG. 14 illustrates an example process flow for a user to register a document in the document management system by using a processing apparatus in which the user is not registered.

In the examples illustrated in FIGS. 13 and 14, the processing apparatus #1 and the processing apparatus #2 are assumed to be installed in the same organization and a destination user is also assumed to belong to the organization. Thus, user authentication is performed by the local user ID server 152 within the organization. If the viewer is a user belonging to an organization different from that in which the processing apparatus #2 is located, neither the processing apparatus #2 nor the local user ID server 152, which is a higher-level device of the processing apparatus #2, is able to authenticate the distributor. In this case, the user ID server 210, which is a further higher-level device, may perform user authentication on the distributor.

In the examples illustrated in FIGS. 13 and 14, another processing apparatus, namely, the processing apparatus #2, acts as an intermediate device between the viewing terminal 104 of a user registered in the processing apparatus #1 and the local user ID server 152 or the local metadata server 156 to exchange data therebetween. However, this is merely an example. Alternatively, for example, if a user has not been registered in the processing apparatus #2 on the basis of the authentication information on the user which is sent from the viewing terminal 104, the processing apparatus #2 may return a response indicating that authentication is not possible to the viewing terminal 104. In this case, the viewing terminal 104 requests the local user ID server 152 to perform authentication by using registered address information of a higher-level device. If the authentication is successful, the viewing terminal 104 accesses the local metadata server 156 and acquires necessary metadata.

In the example illustrated in FIG. 13, a user moves to a local system 100 managed by a processing apparatus 110 different from their own prescribed processing apparatus within the organization to which the user belongs, and views a document. The user who is located outside the organization to which the user belongs may be able to view a document distributed from their own prescribed processing apparatus. In this case, the viewing terminal 104 of the user is authenticated by the user ID server 210 in the central management system 200 and acquires the metadata of the desired document to be viewed from the metadata server 230.

Example of DID

Next, the configuration of a DID 600 used as information identifying an eDoc in the document management system will be described with reference to FIG. 15.

Figure 15:
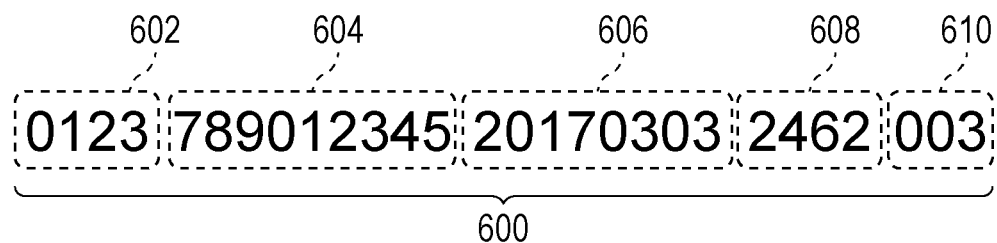
FIG. 15 illustrates an example of the data content of a DID.

As illustrated in FIG. 15, the DID 600 includes an issuance privilege key 602, processing-apparatus-specific information 604, an issuance date 606, an issuance certificate key 608, and an issuance number 610. The numbers of digits in the DID 600 and the elements 602 to 610 illustrated in FIG. 15 are for illustrative purposes only.

The issuance privilege key 602 is key information identifying an issuance privilege assigned to the processing apparatus 110 by the DID server 220. Upon receipt of a request for an issuance privilege and issuance quota from the processing apparatus 110, the DID server 220 generates the issuance privilege key 602 and transmits the issuance privilege key 602 to the processing apparatus 110 together with the value of the issuance quota (for example, up to 100 documents). In a system configuration in which the local DID server 154 is interposed between the DID server 220 and the processing apparatus 110, for example, the DID server 220 collectively assigns multiple sets of issuance privilege keys and issuance quotas to the local DID server 154. This assignment may mean that the DID server 220 requests the local DID server 154 to assign the multiple sets of issuance privilege keys and issuance quotas to the processing apparatus 110. In response to a request for an issuance privilege from the processing apparatus 110 managed by the local DID server 154, the local DID server 154 may assign sets of issuance privilege keys and issuance quotas which have not been assigned to the processing apparatus 110 among the assigned multiple sets of issuance privilege keys and issuance quotas to the processing apparatus 110.

The processing-apparatus-specific information 604 is information specific to the processing apparatus 110 that has issued the DID. That is, the processing-apparatus-specific information 604 in the DID 600 is checked to uniquely identify the processing apparatus 110 that has issued the DID 600. The processing-apparatus-specific information 604 is held by the processing apparatus 110.

The issuance date 606 is a character string, represented as a year/month/day value, indicating the date when the DID 600 was issued. The issuance date of a DID is also the date when an eDoc to which the DID is assigned was generated (encoded).

The issuance certificate key 608 is key information used to prove that the processing apparatus 110 (identified using the processing-apparatus-specific information 604) has issued the DID 600 by using the issuance privilege indicated by the issuance privilege key 602. The issuance certificate key 608 is a value obtained by, for example, encrypting the issuance privilege key 602 by using the secret key for the processing apparatus 110. When a value obtained by decrypting the issuance certificate key 608 by using the public key for the processing apparatus 110 matches the issuance privilege key 602, the DID 600 is proved to have been issued by the processing apparatus 110 by using the issuance privilege key 602. Alternatively, the issuance certificate key 608 may be a value obtained by encrypting the value of a portion of the DID 600 other than the issuance privilege key 602 (or a hash value indicating a predetermined number of digits generated from this value) by using the secret key for the processing apparatus 110. In this case, unless a value obtained by decrypting the issuance certificate key 608 by using the public key for the processing apparatus 110 is inconsistent with the value of the portion of the DID 600 other than the issuance certificate key 608 (for example, if a value obtained as a result of decryption matches the hash value of the value), it is proved that the DID 600 has been issued by the processing apparatus 110 on the basis of the issuance privilege key 602 and that the portion of the DID 600 other than the issuance certificate key 608 is not tampered with.

The issuance number 610 is a serial number indicating the ordinal number of the DID 600 among the DIDs issued by the processing apparatus 110 by using the issuance privilege key 602. A maximum value that can be taken by an issuance number 610 of a DID 600 generated using a certain issuance privilege key 602 is equal to the value of the issuance quota (the number of documents) assigned by the DID server 220 (or the local DID server 154) together with the issuance privilege key 602.

Change of Destinations after Registration

After an eDoc is registered in the document management system, the distributor (or any other person who is given the privilege to change a destination list) may desire to add or delete a destination or modify the privilege to access the eDoc which is granted to the destinations. In this case, for example, the distributor accesses the prescribed processing apparatus 110 by using the creation terminal 102 or the viewing terminal 104 (hereinafter collectively referred to as the user terminal), specifies the DID of the target eDoc, and issues an instruction to edit the destination list (or the access privilege).

Upon receipt of the instruction, the processing apparatus 110 provides an editing screen for editing the destination list and the access privilege to the user terminal if the user who has issued the instruction is verified as being an authorized distributor or any other person of the target eDoc through user authentication. The term "distributor or any other person" collectively refers to a distributor and any other person given the privilege to change the destinations. The editing screen may be similar to the input screen 400 illustrated in FIG. 9. The distributor or any other person adds or deletes a destination user and viewing terminal or changes the content of the access privilege on the editing screen. When the distributor or any other person makes a necessary change on the editing screen and then performs an operation of confirming the change, the processing apparatus 110 reflects the change in the metadata of the eDoc saved therein and reports the changed content to the local metadata server 156 and the metadata server 230, which are higher-level devices of the processing apparatus 110. The local metadata server 156 and the metadata server 230 reflect the reported changed content in the saved metadata of the eDoc. For example, even a user who is designated as the destination when an eDoc is distributed may not be able to view the eDoc if the user is removed from the destination list due to a later change. In response to a change of the destination information in the metadata of the eDoc in the way described above, the processing apparatus 110 may send an instruction to a destination viewing terminal 104 that has been included in the destination information before the change but is not included in the destination information after the change to delete the eDoc file (and the corresponding metadata).

In the example described above, the processing apparatus 110 accepts an instruction to change the destinations of an eDoc or the access privilege. Alternatively or additionally, a higher-level device, that is, the management system 200 (the metadata server 230) or the in-house management system 150 (the local metadata server 156), may accept the change instruction. In this case, the higher-level device transmits new metadata changed in accordance with the change instruction to the processing apparatus 110 that has generated the eDoc (and to the local metadata server 156 within the organization to which the processing apparatus 110 belongs) to replace the existing metadata stored in the processing apparatus 110 with the new metadata.

Management of Status of Processing Apparatus

Next, control based on management of the status of the processing apparatus 110 will be described.

The processing apparatus 110 periodically reports its status to the management system 200. In the management system 200, the processing apparatus management server 240 adds the received status to the status history 242 of the processing apparatus 110 in association with the date and time of receipt of the status. Further, the processing apparatus management server 240 checks the received status and controls whether it is possible to provide services to users of the processing apparatus 110 on the basis of the check result.

Figure 6:
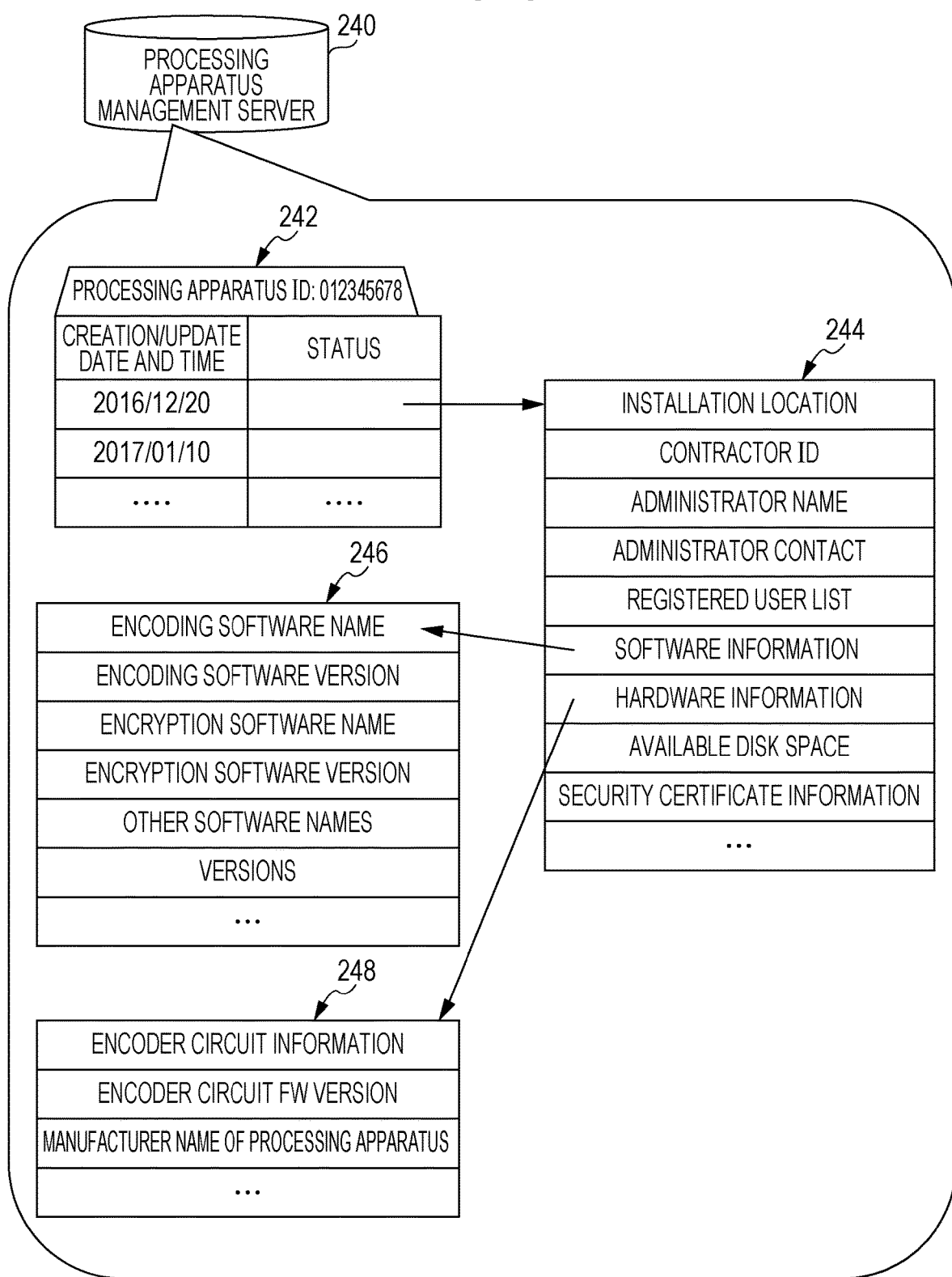
FIG. 6 exemplarily illustrates data content managed by a processing apparatus management server.

The status periodically transmitted from the processing apparatus 110 to the processing apparatus management server 240 includes items similar to those in the status 244 of the processing apparatus 110 exemplarily illustrated in FIG. 6. Note that items of the status 244 that may not be changed by the processing apparatus 110, such as the installation location, the encoder circuit information, and the manufacturer name of the processing apparatus 110, may not be periodically transmitted.

Figure 16:
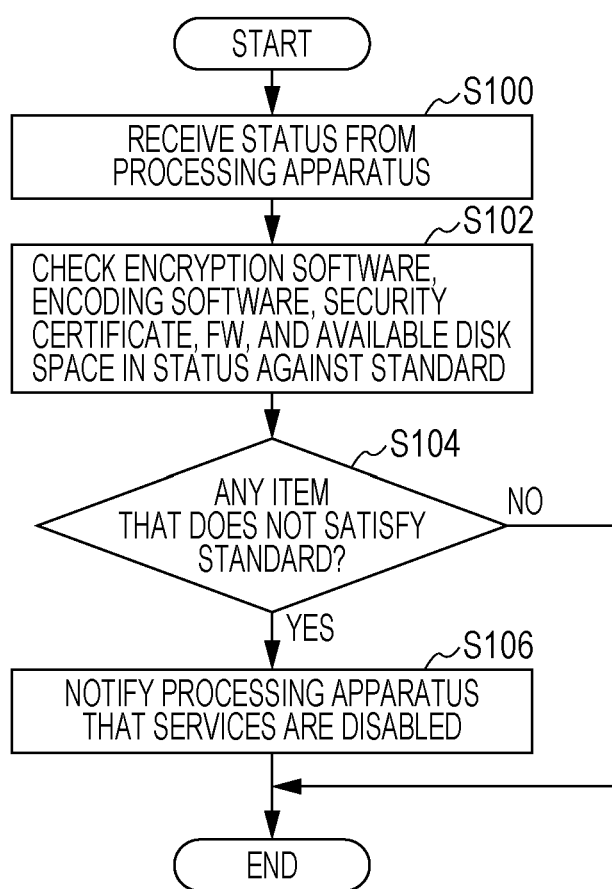
FIG. 16 is a flowchart exemplarily illustrating a processing apparatus status check process performed by the processing apparatus management server.

The processing apparatus management server 240 executes, for example, a process exemplarily illustrated in FIG. 16 on the basis of the status sent from the processing apparatus 110.

First, upon receipt of a status from the processing apparatus 110 (S100), the processing apparatus management server 240 checks the values of the items to be examined in the status against the respective standards of the items (S102). The items to be examined include the name and version of encryption software, the name and version of encoding software, security certificates installed in the processing apparatus 110, information on encryption keys (used for purposes such as communication path encryption or signature, for example, a pair of secret key and public key) installed in the processing apparatus 110, such as identification information of the keys and the date and time of installation of the keys, the name of the encoder circuit, the version of the firmware (FW), installed font types, and the available space of the disk (secondary storage). Examples of the standards of the individual items are that: the versions of the encryption software, the encoding software, and the firmware are most recent (or are more recent than a certain version), the available space of the disk is greater than or equal to a predetermined threshold, the installed security certificate does not include a blacklisted certificate, a predetermined period has not elapsed since the date of installation of the encryption key for the processing apparatus 110, and predetermined types of fonts are installed.

For example, it is desirable that an encryption key used by the processing apparatus 110 for communication path encryption, signature, or the like be periodically changed to a new key in order to maintain the safety. Thus, an encryption key for which a predetermined period has elapsed since the date and time of installation is determined not to satisfy the standard, and provision of services is not allowed (or a warning indicating that provision of services will not be allowed is issued). The exchange for a new key is encouraged.

Then, the processing apparatus management server 240 determines whether the items to be examined in the status received from the processing apparatus 110 include an item that does not satisfy the standard (S104). If all the items to be examined satisfy the respective standards, the process ends for the processing apparatus 110 for which the status is currently received. If it is determined in S104 that an item that does not satisfy the standard is found, the processing apparatus management server 240 notifies the processing apparatus 110 that services are disabled (S106). Upon receipt of this notification, the processing apparatus 110 stops the service for registration (distribution) of a document to the document management system according to this exemplary embodiment. That is, the processing apparatus 110 does not accept a request from the creation terminal 102 to register (distribute) a document, and returns a message indicating that services are not currently available.

This control may reduce the risk of the processing apparatus 110 generating an eDoc whose quality does not satisfy the standards. For example, this control allows provision of services to the processing apparatus 110 to be stopped before an eDoc is generated through insufficiently strong encryption with old encryption software. In addition, services do not become available before such an event occurs as leakage of documents due to an error in the eDoc generation process because of low available disk space or old firmware. Furthermore, services do not become available before a reduction in the image quality of an eDoc file caused by replacing a predetermined font in a document with a different font and encoding the document by a processing apparatus 110 that does not have the font. Other events are also less likely to occur such as limitations on the image size of eDoc files because the image size of documents supported by the most recent firmware is not supported due to the old firmware of the encoder circuit.

The items to be examined in the status may be classified into an item that affects eDoc security and an item that does not affect eDoc security, and the processing apparatus 110 may be made to stop services only when the former item does not satisfy the standard. When the latter item does not satisfy the standard, the processing apparatus 110 or the administrator of the processing apparatus 110 is provided with a warning and is encouraged to address the problem regarding the item. In response to the warning, the administrator of the processing apparatus 110 repairs the processing apparatus 110 in terms of an item for which they can address the problem without help of any expert technician, and otherwise asks the system operator to dispatch a maintenance person. If a specific item among the items to be examined is found not to satisfy the standard, the processing apparatus management server 240 may automatically arrange dispatch of a maintenance person to the processing apparatus 110.

A modification of the process illustrated in FIG. 16 will be described with reference to FIG. 17.

Figure 17:
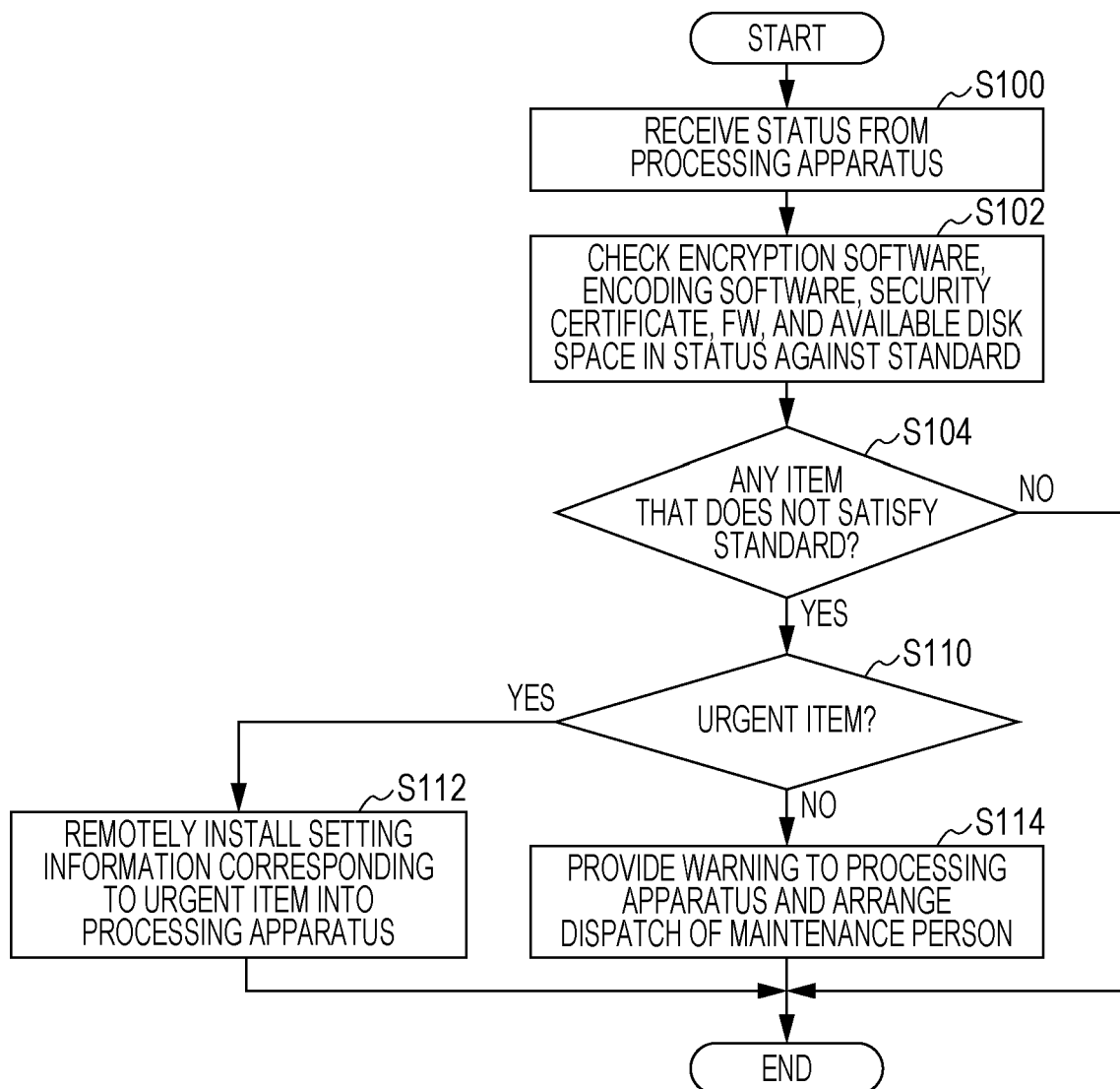
FIG. 17 is a flowchart illustrating another example of the processing apparatus status check process performed by the processing apparatus management server.

In the procedure illustrated in FIG. 17, the items to be examined in the status of the processing apparatus 110 are divided based on another criterion, namely, urgency. An urgent item is an item that greatly affects the quality of an eDoc generated by the processing apparatus 110 in terms of security or that greatly affects the security of the document management system. Sufficient safety may not be ensured for an eDoc generated by a processing apparatus 110 having an urgent item that does not satisfy the standard, or if a processing apparatus 110 having an urgent item that does not satisfy the standard is continuously in operation, the processing apparatus 110 will introduce a security hole (vulnerability) into the document management system. Examples of the urgent item include an encryption software version, security certificates installed in the processing apparatus 110, and discovery of vulnerability in encryption keys installed in the processing apparatus 110.

One method for avoiding a problem caused by an urgent item that does not satisfy the standard is to deactivate a processing apparatus 110 for which an urgent item does not satisfy the standard, dispatch a maintenance person, and correct or repair the processing apparatus 110 for the urgent item. In this case, the user is not able to use the processing apparatus 110 until the correction is completed, which may inconvenience the user.

In the procedure illustrated in FIG. 17, accordingly, if an item that does not satisfy the standard is found in S104, the processing apparatus management server 240 determines whether the found item is an urgent item (S110). If the item is an urgent item, the processing apparatus management server 240 remotely installs setting information for correcting the problem regarding the urgent item into the processing apparatus 110 from the processing apparatus management server 240 via the wide area network 10 (S112). Examples of the setting information for correcting a problem regarding an urgent item include the most recent version of encryption software, the vulnerability-addressed most recent version of a security certificate having an older version in which vulnerability is found, and a new key pair that replaces the pair of secret key and public key for the processing apparatus 110 in which vulnerability is found.

For example, to remotely install a new key pair, the processing apparatus management server 240 prepares a phrase to generate the new key pair, generates a key pair by using the phrase, and transmits the generated key pair to the processing apparatus 110 by using a secure method to remotely install the key pair.

Accordingly, the urgent item that does not satisfy the standard for the processing apparatus 110 is updated into the one that satisfies the standard by using the setting information. In response to this update, the value of the urgent item in the status of the processing apparatus 110, which is stored in the processing apparatus management server 240, is updated.

If the determination result is NO in S110 (if the item is not an urgent item), the processing apparatus management server 240 sends a warning indicating an item that does not satisfy the standard to the processing apparatus 110 or the administrator and arranges dispatch of a maintenance person to the processing apparatus 110 for correction regarding the item (S114). An item that is not an urgent item may be less likely to cause a serious security problem if the processing apparatus 110 is continuously in operation, and a measure is taken by dispatching a maintenance person instead of deactivating the processing apparatus 110. Since the processing apparatus management server 240 does not need to remotely install setting information for items other than urgent items, an increase in the load on the processing apparatus management server 240 may be avoided.

In the example illustrated in FIG. 17, setting information on an urgent item is installed top-down from the processing apparatus management server 240 to the processing apparatus 110. Accordingly, the setting information is installed into the processing apparatus 110 and the value of the urgent item in the status of the processing apparatus 110 is updated. For an item other than urgent items in the status, in contrast, for example, a maintenance person sets or changes the value of the item and installs setting information (for example, the most recent version of encryption software) on the item into each of the processing apparatuses 110. The setting or change of the value of the item in the status which is performed in the processing apparatus 110 is reported to a higher-level device, namely, the processing apparatus management server 240, and, in response to this report, the processing apparatus management server 240 changes the value of the corresponding item in the status of the processing apparatus 110 which is stored in the processing apparatus management server 240.

DID Verification

Upon receipt of a notification of a DID issued by the processing apparatus 110, a request for metadata (this request includes a DID) from the viewing terminal 104, or a request from a user or any other person to verify a DID, the management system 200 verifies whether the DID is correct.

In this case, the DID server 220 verifies the target DID 600 (see FIG. 15) in terms of the following points.

(a) Consistency is found between the issuance privilege key 602 and the processing-apparatus-specific information 604 in the DID 600.

The DID server 220 checks whether the information (see FIG. 5) recorded thereon includes the issuance privilege key 602 as an issuance privilege key to be assigned to the processing apparatus 110 identified by the processing-apparatus-specific information 604. If the issuance privilege key 602 is not included, the issuance privilege key 602 has not been issued to the processing apparatus 110 identified by the processing-apparatus-specific information 604. Thus, both are inconsistent. In this case, the DID 600 is an unauthorized DID.

(b) Consistency is found between the issuance privilege key 602 and the issuance date 606 in the DID 600.

The DID server 220 has recorded thereon, in association with an issuance privilege key, the key assignment date and time and the key termination date and time (see FIG. 5). When the issuance date 606 in the DID 600 is outside the period from the key assignment date and time to the key termination date and time recorded in association with the issuance privilege key 602 in the DID 600, inconsistency is found between the issuance privilege key 602 and the issuance date 606. In this case, the DID 600 is an unauthorized DID.

(c) Consistency is found among the issuance privilege key 602, the processing-apparatus-specific information 604, and the issuance certificate key 608 in the DID 600.

The DID server 220 decrypts the issuance certificate key 608 by using the public key for the processing apparatus 110 identified by the processing-apparatus-specific information 604 and determines whether the issuance certificate key obtained as a result of the decryption matches the issuance certificate key 608 in the DID 600. If no match is found, these three elements are inconsistent and the DID 600 is therefore found to be unauthorized.

(d) The issuance number 610 in the DID 600 is consistent with the issuance quota corresponding to the issuance privilege key 602.

The DID server 220 has recorded thereon the issuance quota assigned to the processing apparatus 110 together with the issuance privilege key 602 (see FIG. 5). When the issuance number 610 in the DID 600 is larger than the value specified in the issuance quota recorded in association with the issuance privilege key 602, the corresponding DID is an unauthorized DID.

(e) The issuance number 610 in the DID 600 is consistent with the issuance number of the issued DID including the same issuance privilege key as the issuance privilege key 602 in the DID 600. This standard is used for, upon receipt of a notification of a newly issued DID from the processing apparatus 110, verification of whether the DID is inconsistent with the already issued DID.

The DID server 220 has recorded thereon, in association with an issuance privilege key, a DID issued using the issuance privilege key and information on the date and time of issuance (the issued DID list in FIG. 5). The DID server 220 checks whether issued DIDs having the same issuance privilege key as the issuance privilege key 602 in the DID 600 to be verified include a DID having the same issuance number as the issuance number 610 in the DID 600. If such a DID is included, the DID 600 is determined to be unauthorized.

(f) The combination of the issuance date 606 and the issuance number 610 in the DID 600 is consistent with the combination of the issuance date and issuance number of an issued DID including the same issuance privilege key as the issuance privilege key 602 in the DID 600.

The DID server 220 determines whether the combination of the issuance date 606 and the issuance number 610 in the DID 600 to be verified is inconsistent with the combination of the issuance date and issuance number of an individual issued DID including the same issuance privilege key as the issuance privilege key 602 in the DID 600, that is, whether there are combinations in which the order of the two issuance dates (chronological or ascending order) and the order of the two issuance numbers (descending order) are opposite. For example, if an issued DID whose issuance date is later than that of the DID 600 and whose issuance number is smaller than that of the DID 600 is found, inconsistency is found between the DID 600 and the found issued DID, that is, the orders are opposite. If such inconsistency is found, only the DID 600 to be verified or both the DID 600 and the issued DID are determined to be unauthorized.

If a certain DID is determined to be unauthorized as a result of verification based on the standards described above, the DID server 220 transmits a warning to the administrator of the processing apparatus 110 related to the unauthorized DID via electronic mail or any other suitable method. The warning includes a message indicating that a DID falsified to be issued by the processing apparatus 110 has been found. In response to the warning, the administrator takes measures to strengthen security. The administrator of the processing apparatus 110 or the contact of the administrator may be obtained from information (see FIG. 6) stored in the processing apparatus management server 240. The processing apparatus 110 related to the unauthorized DID, which is the destination of the warning, is a processing apparatus 110 identified by the processing-apparatus-specific information 604 included in the DID. The warning may be transmitted to a processing apparatus 110 that has previously assigned the same issuance privilege key as the issuance privilege key included in the unauthorized DID.

Process Performed in Response to Discovery of Vulnerability in eDoc Encryption

A process performed in response to the discovery of vulnerability in encryption software used for encryption to generate an eDoc file will now be described. If the operator of the document management system finds the discovery of vulnerability in a specific version of encryption software used by any of the processing apparatuses 110, the management system 200 transmits a vulnerability notification to each of the processing apparatuses 110. The vulnerability notification includes information on the name and version of encryption software in which vulnerability has been discovered. When the in-house management system 150 is present, the vulnerability notification is passed from the management system 200 to the in-house management system 150, and the in-house management system 150 transmits the vulnerability notification to each of the subordinate processing apparatuses 110. In response to the notification, each of the processing apparatuses 110 executes a process exemplarily illustrated in FIG. 18.

Upon receipt of a vulnerability notification (S200) from a higher-level device (the management system 200 or the in-house management system 150), the processing apparatus 110 identifies a file encrypted by the processing apparatus 110 by using the version of encryption software in which the vulnerability indicated in the notification is found (S202). The document DB 116 in the processing apparatus 110 stores eDoc files generated by the processing apparatus 110 and corresponding metadata, and the metadata of each of the eDoc files is used to identify the encryption software name and version used to generate the corresponding one of the eDocs (see the example structure of metadata illustrated in FIG. 3). In S202, the processing apparatus 110 identifies an eDoc for which the combination of encryption software name and version in the metadata matches the combination given in the vulnerability notification.

Then, the processing apparatus 110 re-encrypts each identified eDoc file by using the current version of encryption software installed therein (S204). In this example, it is assumed that the encryption software in the processing apparatus 110 has been appropriately updated and that no vulnerability is discovered in the current version of the encryption software in the processing apparatus 110. In general, vulnerability is more likely to be discovered in the version of encryption software previously used by the processing apparatus 110. If the version of encryption software for which vulnerability is reported is the current version of encryption software in the processing apparatus 110, the processing apparatus 110 downloads the most recent version of encryption software from a higher-level device or the like and performs re-encryption by using the most recent version. If vulnerability is discovered in the most recent version of encryption software that is currently used, it is expectable that the higher-level device includes a more recent, vulnerability-addressed version of encryption software or includes information on the distributor of the software. The re-encryption is performed by, for example, decrypting the target eDoc file by using information on a decryption key recorded in the metadata corresponding to the eDoc file and encrypting the decrypted file by using a newly generated encryption key in accordance with a vulnerability-free version of encryption software. It is assumed that the metadata saved in the processing apparatus 110 includes information on the decryption key in such a manner that, for example, the decryption key has been encrypted by using the public key for the processing apparatus 110. Also, the metadata to be sent to a higher-level device may include the decryption key in such a manner that the decryption key has been encrypted by using the public key for the higher-level device.

The processing apparatus 110 updates the metadata of the eDoc file in accordance with the re-encryption (S206). That is, the processing apparatus 110 rewrites the encoding date and time and the encryption information (the encryption software name, the version information, and the key information) in the metadata (see FIG. 3) into the date and time of the re-encryption, the name and version of the encryption software used for the re-encryption, and information on a decryption key for unlocking the re-encryption. Then, the processing apparatus 110 saves the updated metadata (as, for example, the most recent metadata of the eDoc file) and uploads the metadata to a higher-level device. The higher-level device saves the uploaded updated metadata.

Thereafter, the processing apparatus 110 executes a process for distributing the eDoc file obtained as a result of the re-encryption to each of the destination viewing terminals 104 specified in the destination information in the metadata (S208). That is, for example, the processing apparatus 110 sends a distribution preparation completion notification to each of the destination viewing terminals 104 (see step (7) in FIG. 8). This notification may include, in addition to the DID and the document name, information indicating that the eDoc to be distributed is an update of the previously distributed eDoc. Upon receipt of the distribution preparation completion notification, the viewing terminal 104 overwrites the previous eDoc file before the re-encryption, which is stored therein, with an eDoc file acquired from the processing apparatus 110 when the viewer designates the eDoc for which the distribution preparation completion notification is received as a result of the re-encryption as the target to be viewed on the list screen 500 (see FIG. 11) of the viewing terminal 104. Further, the viewing terminal 104 saves the updated metadata received together with the eDoc file as the most recent metadata of the eDoc. Thus, the eDoc file encrypted with the vulnerable encryption software and the corresponding metadata are no longer present in the viewing terminal 104, and the eDoc file re-encrypted with encryption software in which no vulnerability is found and the corresponding metadata are present instead.

When or before sending a distribution preparation completion notification of a re-encrypted eDoc, the processing apparatus 110 may explicitly transmit a deletion notification including the DID of the eDoc to each of the destination viewing terminals 104. In this case, each of the viewing terminals 104 deletes the existing eDoc file (before the re-encryption) having the DID in accordance with the instruction. At this time, the existing metadata may also be deleted.

Other Example of Designation of Destination Terminal

In the example described above, destination users and the viewing terminals 104 selectable by the distributor on the user interface (UI) screen (the input screen 400 illustrated in FIG. 9) of the creation terminal 102 are limited to users and the viewing terminals 104 registered in the processing apparatuses 110 within the same local systems 100 or users and the viewing terminals 104 registered in the in-house management system 150 within the same organization (in this case, users and the viewing terminals 104 registered in the other processing apparatuses 110 may also be designated as destinations).

In some cases, during a meeting with other organization's personnel (guests), a user in an organization may desire to make created documents, such as a meeting note, temporarily accessible to the guests. In these cases, it is bothersome to register the guests or mobile terminals carried by the guests in the processing apparatus 110 or its higher-level device or to cancel the registration after viewing.

Accordingly, this exemplary embodiment enables distribution of an eDoc to a viewing terminal 104 identified as a terminal carried by a guest (hereinafter referred to as a "guest terminal") under certain restrictions.

For example, a terminal of a user near the creation terminal 102 is identified as a guest terminal, and the guest terminal is added to the list of selectable options in the destination terminal selection menu 406. Alternatively, a terminal of a user near the processing apparatus 110 is identified as a guest terminal, and the guest terminal is added to the list of selectable options in the destination terminal selection menu 406. The creation terminal 102 or the processing apparatus 110 is typically installed in a room in the building of an organization (for example, a room for a department or a meeting room), and a person near the creation terminal 102 or the processing apparatus 110 is expected to be a person who has entered the room with permission to participate in a meeting or the like.

For example, the processing apparatus 110 or the creation terminal 102 searches for a partner terminal with which the processing apparatus 110 or the creation terminal 102 is capable of communicating by using short range wireless communication such as Bluetooth Low Energy (registered trademark), and determines that the found partner terminal or a terminal among partner terminals found as a result of the search that is at a distance less than or equal to a predetermined threshold from the processing apparatus 110 or the creation terminal 102 (in some short range wireless communication, the communication distance to the partner terminal may be determined) is a nearby guest terminal. On the destination terminal selection menu 406, the terminal name of the guest terminal detected by the processing apparatus 110 or the creation terminal 102 is displayed as a selectable option in a manner different from that of the pre-registered viewing terminals 104 within the organization. The distributor is able to select a guest terminal as a destination from among them.

The processing apparatus 110 or the creation terminal 102 may select only a terminal satisfying a predetermined condition among the nearby terminals, rather than all of the nearby terminals, as guest terminals to be added to the list of selectable destinations. Examples of the condition include a condition that the version of a viewer application or any other specific software installed in the terminal is greater than or equal to a certain version, and a condition that the terminal is not included in a predetermined terminal rejection list.

A user who carries a guest terminal has not typically been registered in the processing apparatus 110, the local user ID server 152, or the like. Thus, upon receipt of a request for an eDoc file or metadata from a guest terminal designated as distribution destination of a document, the processing apparatus 110 may distribute the eDoc file and the metadata to the guest terminal without performing user authentication. The metadata of the eDoc to be distributed to the guest terminal incorporates a deletion instruction for deleting the eDoc file and metadata from the guest terminal when a deletion condition is satisfied. Examples of the deletion condition include the completion of the display of the eDoc on a screen, and the lapse of a predetermined permission period from the time of distribution. At the point in time when the deletion condition is satisfied, the guest terminal deletes the eDoc file and the metadata. Thus, the risk of leakage of the eDoc by the guest terminal may be reduced.

Actions Taken in Response to Request from Non-Destination Terminal

The example described above is based on push distribution in which the processing apparatus 110 distributes an eDoc (or a distribution preparation completion notification of the eDoc) to a viewing terminal 104 designated as a destination by the distributor.

Another example may be based on pull distribution in which, in response to a request from the viewing terminal 104, the processing apparatus 110 provides a list of eDocs held by the processing apparatus 110 to the viewing terminal 104 and distributes the eDoc to be viewed that is selected by the user from the list to the viewing terminal 104. In the pull distribution, the destination user may access the processing apparatus 110 from a viewing terminal 104 that is not designated as a destination and may request an eDoc. In response to this request, the processing apparatus 110 may take the following actions.

First Method

Upon receipt of a request from a viewing terminal 104 to distribute an eDoc, the processing apparatus 110 determines whether the viewing terminal 104 is a viewing terminal designated as a destination in the destination information in the most recent metadata of the eDoc. If the viewing terminal 104 is determined not to be a viewing terminal designated as a destination, the processing apparatus 110 does not transmit the file (body) of the eDoc or the metadata to the viewing terminal 104. If the viewing terminal 104 is determined to be a viewing terminal designated as a destination, the processing apparatus 110 may further determine whether the user who has made the distribution request (or the combination of the user and the viewing terminal 104) is included in the destination information in the metadata. If the user is included, the processing apparatus 110 may distribute the eDoc, and if the user is not included, the processing apparatus 110 may not distribute the eDoc.

In the first method, accordingly, the eDoc (the file that is the body and the metadata) is not distributed to a viewing terminal 104 that is not a destination specified by the distributor.

Second Method

In this method, if a viewing terminal 104 that has sent a request for distributing an eDoc is not a destination viewing terminal 104 specified in the destination information in the metadata of the eDoc, the processing apparatus 110 transmits the file that is the body of the eDoc and the metadata to the viewing terminal 104 so long as the user who has issued the request (i.e., the user who is using the viewing terminal 104) is included as a destination in the destination information. In this case, however, the processing apparatus 110 incorporates flag information indicating that it is not possible to save the eDoc file and the metadata in the eDoc file and metadata to be transmitted. The viewing terminal 104 displays the eDoc file and metadata including the flag information indicating that it is not possible to save the eDoc file and the metadata, but does not accept a saving instruction from the user. After the user has completed viewing, the viewing terminal 104 discards the eDoc file and the metadata without saving them.

Instead of the method in which the eDoc file and metadata transmitted to the viewing terminal 104 designated as a destination are not saved in the viewing terminal 104, a method may be conceived in which the eDoc file and the metadata are temporarily saved. In this case, when the viewing terminal 104 is to open the eDoc file again later, the viewing terminal 104 requests the processing apparatus 110 or the like to transmit the most recent metadata of the eDoc (this request is used for requesting permission of viewing). In response to this request, the processing apparatus 110 determines whether the combination of the viewing terminal 104 and the requesting user is included in the destination information in the metadata. If the combination is not included, the processing apparatus 110 sends an instruction to the viewing terminal 104 to delete the eDoc. In accordance with the instruction, the viewing terminal 104 deletes the eDoc file saved therein and the corresponding metadata. The processing apparatus 110 may simply return the most recent metadata in response to the request instead of explicitly sending an instruction to the viewing terminal 104 that has requested the most recent metadata to delete the eDoc. In this case, the viewing terminal 104 may determine whether the received most recent metadata includes the combination of the viewing terminal 104 and the current user. If the combination is not included, the viewing terminal 104 may delete the eDoc file saved therein without opening the eDoc file.

Figure 18:
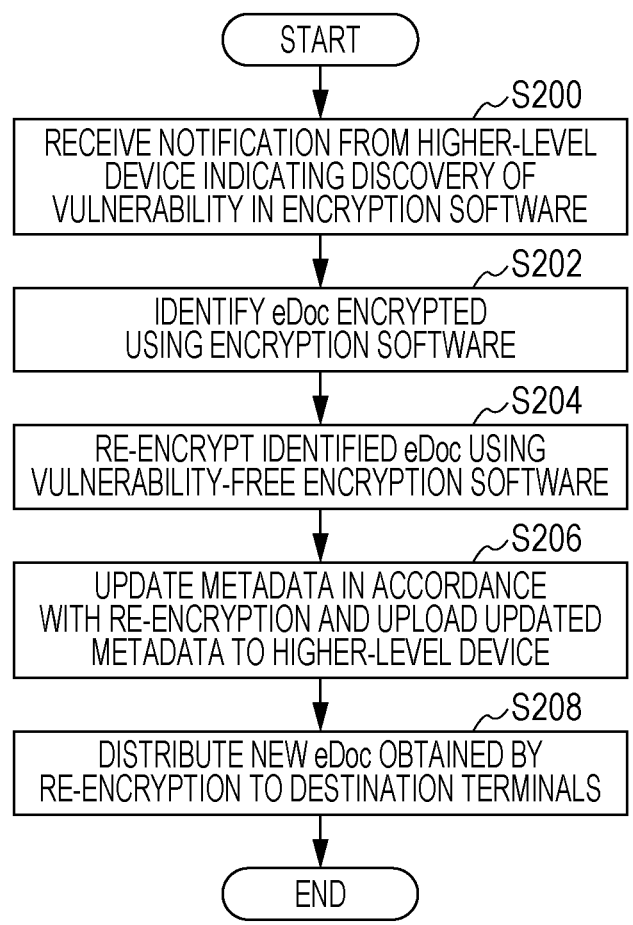
FIG. 18 is a flowchart exemplarily illustrating a process performed by the processing apparatus when vulnerability is found in encryption software.

In the example illustrated in FIG. 18 described above, a re-encrypted eDoc file inherits the DID of the previous eDoc file before the re-encryption. Alternatively, a DID different from that of the previous eDoc file before the re-encryption may be assigned to the re-encrypted eDoc file. In this case, the processing apparatus 110 sends an explicit deletion instruction including the DID of the previous eDoc file before the re-encryption to each of the destination viewing terminals 104 to prevent the previous eDoc file before the re-encryption in which vulnerability is found from being left in the viewing terminal 104. In addition, association information indicating that the re-encrypted eDoc file and the previous eDoc file before the re-encryption correspond to the same document is recorded on the metadata corresponding to the re-encrypted eDoc file or is recorded in the processing apparatus 110 (or a higher-level device, namely, the DID server 220 or the local DID server 154). When the association information is recorded on the metadata corresponding to the re-encrypted eDoc, for example, the DID of the previous eDoc before the re-encryption may be included in the metadata as, for example, a "DID before update" item.

An exemplary embodiment of the present invention has been described. The devices exemplarily illustrated above, such as the creation terminal 102, the viewing terminal 104, the processing apparatus 110, the local user ID server 152, the local DID server 154, the local metadata server 156, the user ID server 210, the DID server 220, the metadata server 230, and the processing apparatus management server 240, are implemented by causing a computer to execute a program indicating the functions of the devices described above. The computer has a circuit configuration in which hardware components, such as a microprocessor such as a central processing unit (CPU), memory devices (primary storage) such as a random access memory (RAM) and a read-only memory (ROM), a controller that controls fixed storage such as a flash memory, a solid-state drive (SSD), and a hard disk drive (HDD), various input/output (I/O) interfaces, and a network interface that performs control for connection with a network such as a local area network, are connected to one another via a bus, for example. A program describing the processing of the functions of these components is saved in the fixed storage such as the flash memory via a network or the like and is installed into the computer. The program stored in the fixed storage is loaded onto the RAM and is executed by a microprocessor such as the CPU to implement the functional modules exemplified above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management system comprising:
a management server; and
a processor,
the processor being programmed to:
acquire a document file and information on a destination to which the document file is to be transmitted,
request a document identification (DID) issuance privilege from the management server that permits the processor to assign a DID to the document file,
request an issuance quota that permits the processor to issue a predetermined number of DIDs,
assign the DID to the document file after the management server assigns the issuance privilege and the issuance quota to the processor,
protect the document file to create a protected document file,
transmit metadata of the document file to the management server, and transmit the protected document file to the destination, the metadata including the information on the destination,
the management server including a memory that stores metadata of documents received from the processor, and
wherein the management server is programmed to respond to a request for metadata corresponding to a document by returning metadata of the document which is stored in the memory.

2. The document management system according to claim 1, further comprising:
a viewing device, the viewing device including a processor programmed to:
receive the protected document file from the processor, and
receive the metadata corresponding to the protected document file from the management server.

3. The document management system according to claim 2, wherein
the processor of the viewing device is further programmed to:
authenticate a user who uses the viewing device, and
unprotect the protected document file to obtain an unprotected document and present the unprotected document to the user when a combination of the viewing device and the user authenticated by the processor of the viewing device matches a combination of a destination user and a destination viewing device indicated by the information on the destination in the metadata received by the processor of the viewing device.

4. The document management system according to claim 3, wherein
the processor is one of a plurality of processors, each of the plurality of processors is located on one of a plurality of local networks, and each of the local networks is associated with one of the plurality of processors,
the management server is located on an external network, the external network being external to the local networks on which the respective processors are located and being connected to the local networks,
the processor of the viewing device receives the protected document file from the processor connected to a local network to which the viewing device is connected among the plurality of processors, and
the processor of the viewing device receives the metadata corresponding to the protected document file from the management server located on the external network.

5. The document management system according to claim 3, wherein
the protected document file is generated by performing an encryption process on the document acquired by the processor, and
the processor is further programmed to:
perform a control to, when vulnerability is found during the encryption process used to generate the protected document file, generate a second protected document file by performing a second encryption process on the document, the second encryption process being a process during which no vulnerability is found, and transmit the second protected document file to the viewing device at the destination.

6. The document management system according to claim 5, wherein the processor is further programmed to perform a control to cause the viewing device at the destination to delete the protected document file generated using the encryption process during which vulnerability is found.

7. The document management system according to claim 2, wherein
the protected document file is generated by performing an encryption process on the document acquired by the processor, and
the processor is further programmed to:
perform a control to, when vulnerability is found during the encryption process used to generate the protected document file, generate a second protected document file by performing a second encryption process on the document, the second encryption process being a process during which no vulnerability is found, and transmit the second protected document file to the viewing device at the destination.

8. The document management system according to claim 7, wherein the processor is further programmed to perform a control to cause the viewing device at the destination to delete the protected document file generated using the encryption process during which vulnerability is found.

9. The document management system according to claim 2, wherein
the processor is one of a plurality of processors, each of the plurality of processors is located on one of a plurality of local networks, and each of the local networks is associated with one of the plurality of processors,
the management server is located on an external network, the external network being external to the local networks on which the respective processors are located and being connected to the local networks,
the processor of the viewing device receives the protected document file from a processor connected to a local network to which the viewing device is connected among the plurality of processors, and
the processor of the viewing device receives the metadata corresponding to the protected document file from the management server located on the external network.

10. A processing apparatus comprising:
a processor programmed to:
   acquire a document file and information on a destination to which the document file is to be transmitted;
   request a document identification (DID) issuance privilege from a management server that permits the processor to assign a DID to the document file,
   request an issuance quota that permits the processor to issue a predetermined number of DIDs,
   assign the DID to the document file after the management server assigns the issuance privilege and the issuance quota to the processor,
   protect the document file to create a protected document file, and
   transmit metadata of the document to a management server and transmit the protected document file to the destination, the metadata including the information on the destination,
wherein the management server is configured to manage management information on documents sent from the processor.

11. The processing apparatus according to claim 10, wherein
   the protected document file is generated by performing an encryption process on the document acquired by the processor, and
   the processor is further programmed to perform a control to, when a vulnerability is found during the encryption process used to generate the protected document file transmitted from the transmitter, generate a second protected document file by performing a second encryption process on the document, the second encryption process being a process during which no vulnerability is found, and transmit the second protected document file to the destination.

12. The processing apparatus according to claim 11, wherein the processor is further programmed to perform a control to cause the destination to delete the protected document file generated using the encryption process during which vulnerability is found.

* * * * *